US009588487B2

(12) United States Patent
Sasaki et al.

(10) Patent No.: US 9,588,487 B2
(45) Date of Patent: Mar. 7, 2017

(54) IMAGE FORMING APPARATUS

(71) Applicant: CANON KABUSHIKI KAISHA, Tokyo (JP)

(72) Inventors: Tsutomu Sasaki, Yokohama (JP); Hiroshi Kawamura, Suntou-gun (JP); Tadashi Okanishi, Mishima (JP); Masaki Kobayashi, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/193,689

(22) Filed: Jun. 27, 2016

(65) Prior Publication Data

US 2016/0306322 A1 Oct. 20, 2016

Related U.S. Application Data

(63) Continuation of application No. 14/952,110, filed on Nov. 25, 2015, now Pat. No. 9,413,916.

(30) Foreign Application Priority Data

Nov. 28, 2014 (JP) .................................. 2014-241977
Nov. 28, 2014 (JP) .................................. 2014-241978
May 22, 2015 (JP) .................................. 2015-104703

(51) Int. Cl.
 *G03G 21/20* (2006.01)
 *H04N 1/00* (2006.01)
 *G06K 15/12* (2006.01)

(52) U.S. Cl.
 CPC .......... *G03G 21/206* (2013.01); *G06K 15/12* (2013.01); *H04N 1/00888* (2013.01); *H04N 1/00981* (2013.01)

(58) Field of Classification Search
 CPC .......... H04N 1/00885; H04N 1/00981; G03G 21/206; G06K 15/12
 See application file for complete search history.

(56) References Cited

U.S. PATENT DOCUMENTS

| 5,647,727 | A | 7/1997 | Taniguchi et al. |
| 6,324,361 | B1 * | 11/2001 | Itoh .................. G03G 21/206 399/92 |
| 8,639,148 | B2 | 1/2014 | Kyung et al. |
| 2003/0219274 | A1 | 11/2003 | Hirose et al. |
| 2006/0083535 | A1 | 4/2006 | Shepherd et al. |

FOREIGN PATENT DOCUMENTS

| JP | 08-006477 A | 1/1996 |
| JP | 2006-239870 A | 9/2006 |
| JP | 2006-308744 A | 11/2006 |
| JP | 2008-242488 A | 10/2008 |

* cited by examiner

*Primary Examiner* — Hoang Ngo
(74) *Attorney, Agent, or Firm* — Fitzpatrick, Cella, Harper & Scinto

(57) ABSTRACT

The image forming apparatus includes the fan motor that cools an FET, and a CPU that predicts temperature of the FET, and controls the rotation speed of the fan motor based on the predicted temperature of the FET, wherein the CPU determines the rotation speed of the fan motor at the start of image forming operation, based on predicated temperature of the FET of the time when the image forming operation starts.

16 Claims, 17 Drawing Sheets

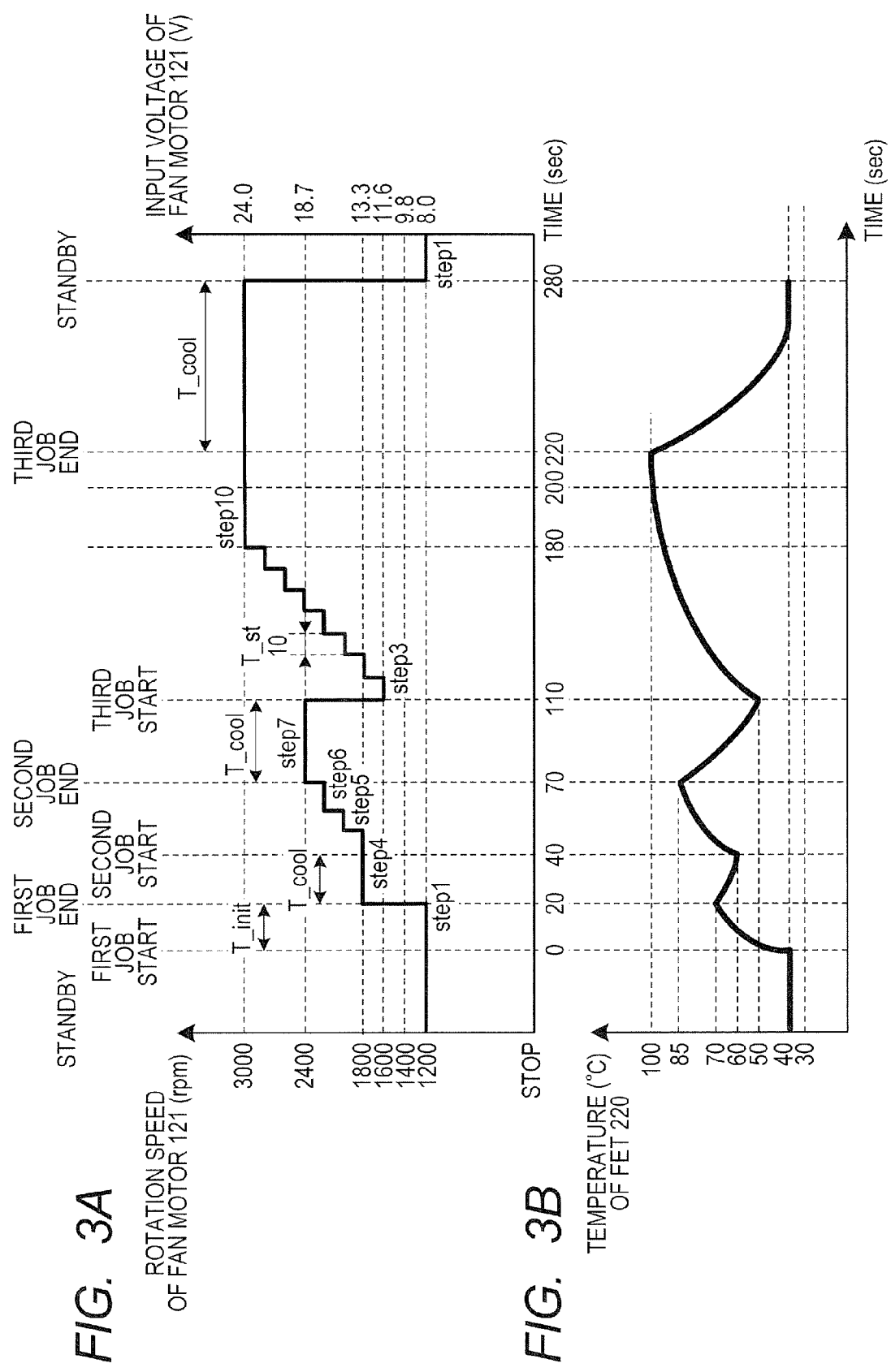

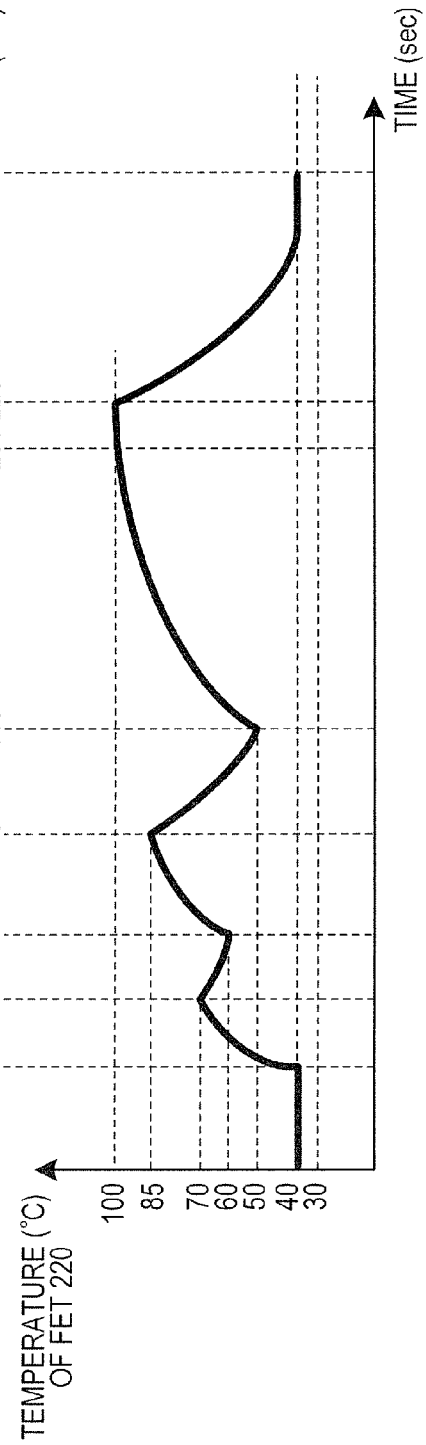
FIG. 4A
FIG. 4B

| FIG. 8A |
| FIG. 8B |

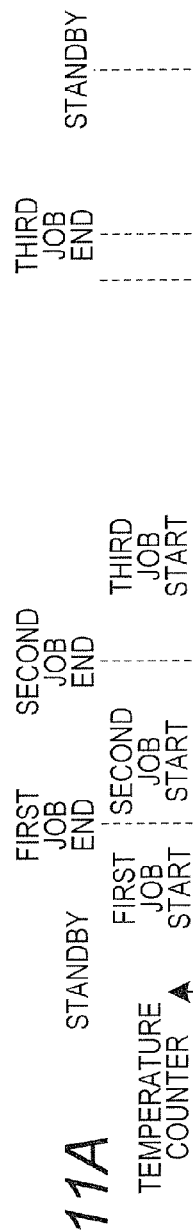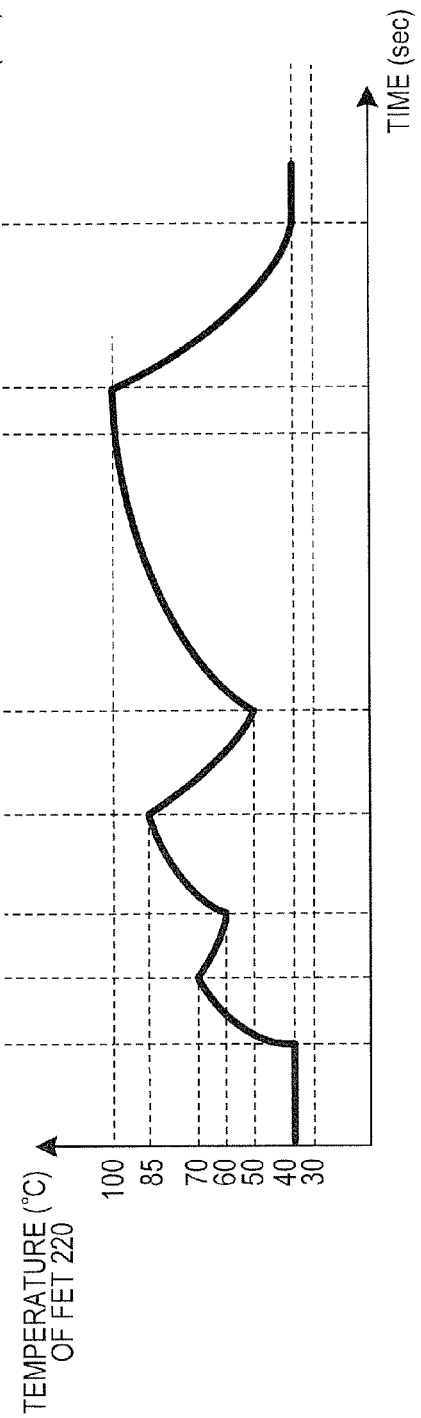
FIG. 11A
FIG. 11B

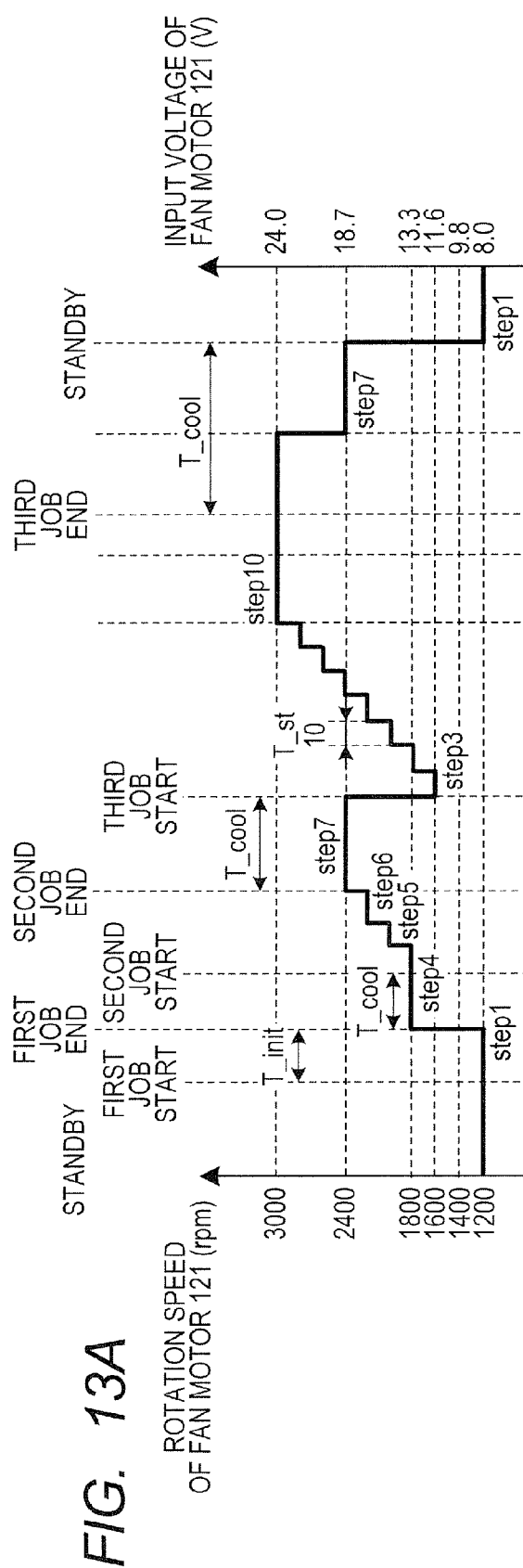
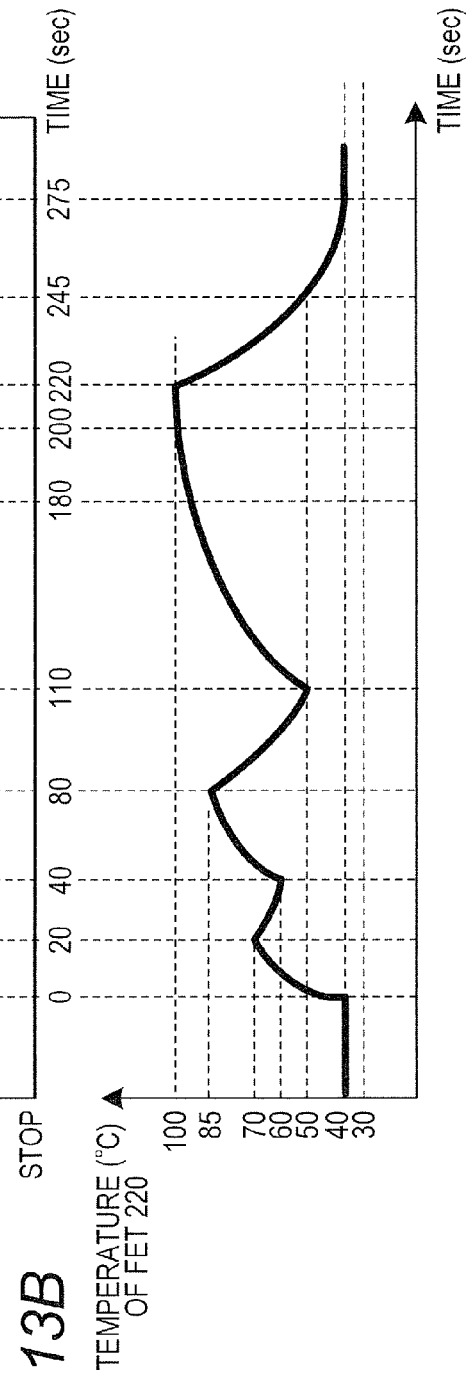
FIG. 13A
FIG. 13B

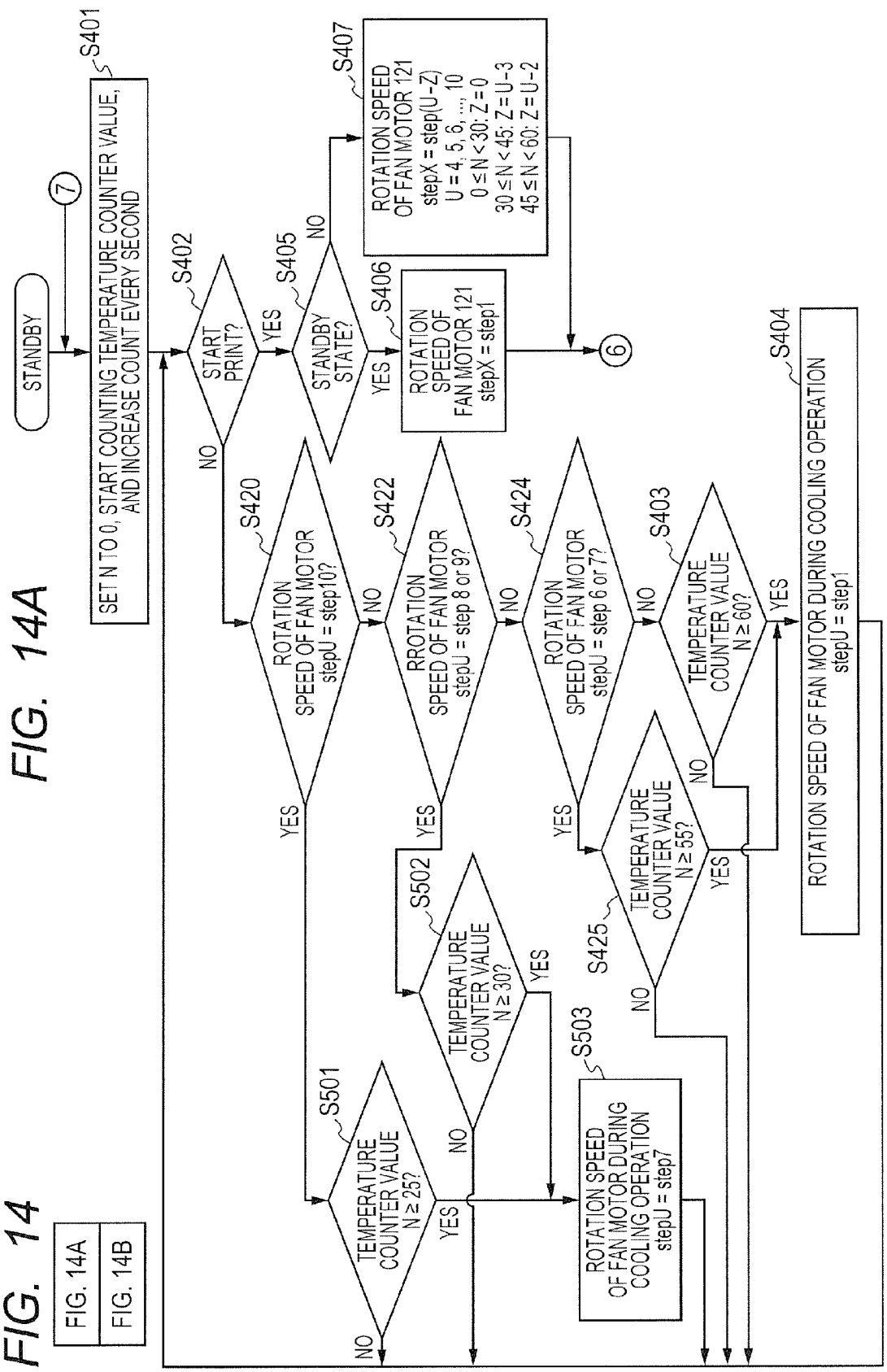

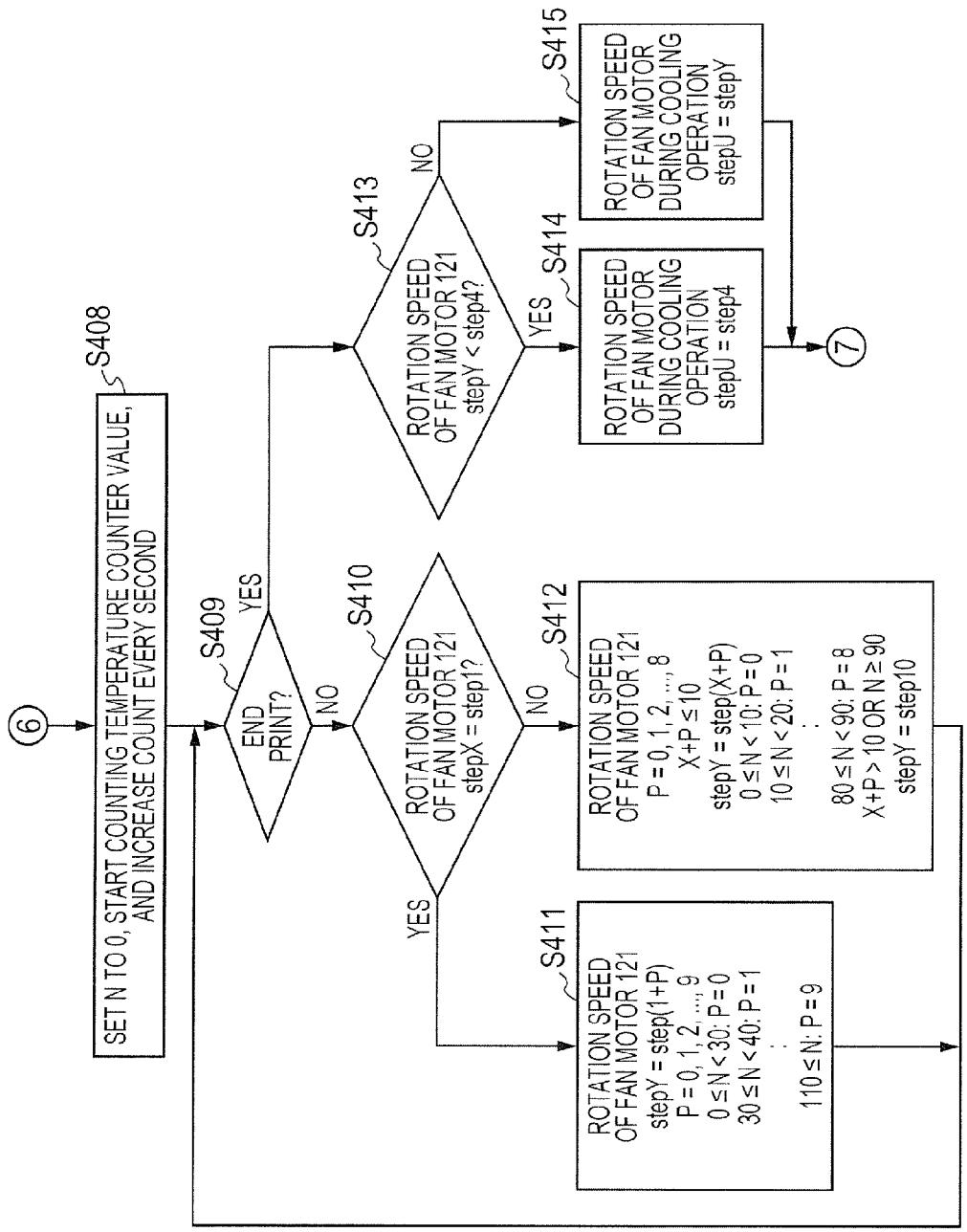

IMAGE FORMING APPARATUS

BACKGROUND OF THE INVENTION

Field of the Invention

The present invention relates to an image forming apparatus, such as an electrophotographic copying machine and an electrophotographic printer.

Description of the Related Art

In an image forming apparatus using an electrophotographic system, such as a copying machine and a printer, a fan motor is widely used as a cooling unit of a power supply unit, a fixing unit and a processing unit that transfers an electrostatic latent image to a recording medium. In an image forming apparatus including a plurality of fan motors, the plurality of fans are driven at full-speed revolutions during operation of the image forming apparatus, during printing, and for a predetermined time after the end of printing. Therefore, there is a problem that operation sound caused by wind noise of the fans enters an audible range of the user.

The following configuration is proposed as a method of reducing the operation sound caused by the wind noise of the plurality of fan motors. More specifically, the fan motors are controlled such that other fan motors are stopped when some of the fan motors are in operation, and operation states of the fan motors are alternately switched at each predetermined period (for example, see Japanese Patent Application Laid-Open No. 2008-242488).

However, in the configuration with the plurality of fan motors, the operation sound caused by the wind noise of the fan motors may be heard more than the other sound in the operation sound of the image forming apparatus. Therefore, a countermeasure for driving the fan motors according to the temperature state of the apparatus (for example, power supply apparatus) to be cooled by the fan motors to thereby reduce the noise caused by the wind noise of the fan motors in printing is desired. In a post-cooling state after the end of printing, the wind noise of the fan motors are heard more, and a countermeasure for reducing the operation sound caused by the fan motors is necessary.

SUMMARY OF THE INVENTION

The present invention has been made in view of the circumstances, and an object of the present invention is to reduce operation sound of fan motors.

To solve the problems, the object of the present invention is to provide an image forming apparatus for forming an image on a recording material, wherein the image forming apparatus includes a cooling unit configured to cool a portion to be cooled; and a control unit configured to control a rotation speed of the cooling unit, wherein the control unit determines the rotation speed of the cooling unit of the time when an image forming operation starts, based on a period during the cooling unit rotates before the image forming operation starts or based on a period during the cooling unit stops before the image forming operation starts, and in stages, increases the rotation speed of the cooling unit in a period of the image forming operation.

To solve the problems, the object of the present invention is to provide an image forming apparatus for forming an image on a recording material, wherein the image forming apparatus includes a cooling unit configured to cool a portion to be cooled, and a control unit configured to control a rotation speed of the cooling unit, wherein the control unit increases the rotation speed of the cooling unit in a period of the image forming operation with a cycle in stages, the control unit determines the cycle of increasing the rotation speed of the cooling unit in a period of image forming operation, based on a period during the cooling unit rotates before the image forming operation starts or based on a period during the cooling unit stops before the image forming operation starts.

To solve the problems, the object of the present invention is to provide an image forming apparatus for forming an image on a recording material, the apparatus including a cooling unit configured to cool a portion to be cooled, and a control unit configured to control the rotation speed of the cooling unit, wherein the control unit sets a period of a cooling operation for cooling the portion to be cooled after an image forming operation ends so that the faster the rotation speed of the cooling unit of the time when the cooling unit starts the cooling operation, the shorter the period of the cooling operation is.

Further features of the present invention will become apparent from the following description of exemplary embodiments with reference to the attached drawings.

BRIEF DESCRIPTION OF THE DRAWINGS

FIGS. 3A and 3B are a diagram illustrating a relationship between a time chart of the rotation speed of the fan motor and temperature of an FET according to the first embodiment.

FIGS. 4A and 4B are a diagram illustrating a relationship a time chart of a temperature counter of the FET and the temperature of the FET according to the first embodiment.

FIGS. 11A and 11B are a diagram illustrating a relationship between the time chart of the temperature counter of the FET and the temperature of the FET according to the fourth embodiment.

FIGS. 13A and 13B are a diagram illustrating a relationship between the time chart of the rotation speed of the fan motor and the temperature of the FET according to the fifth embodiment.

FIG. 14 composed of FIGS. 14A and 14B is a flow chart illustrating a control process of the rotation speed of the fan motor according to the fifth embodiment.

DESCRIPTION OF THE EMBODIMENTS

Preferred embodiments of the present invention will now be described in detail in accordance with the accompanying drawings.

First Embodiment

Configuration of Image Forming Apparatus

Figure 1A:
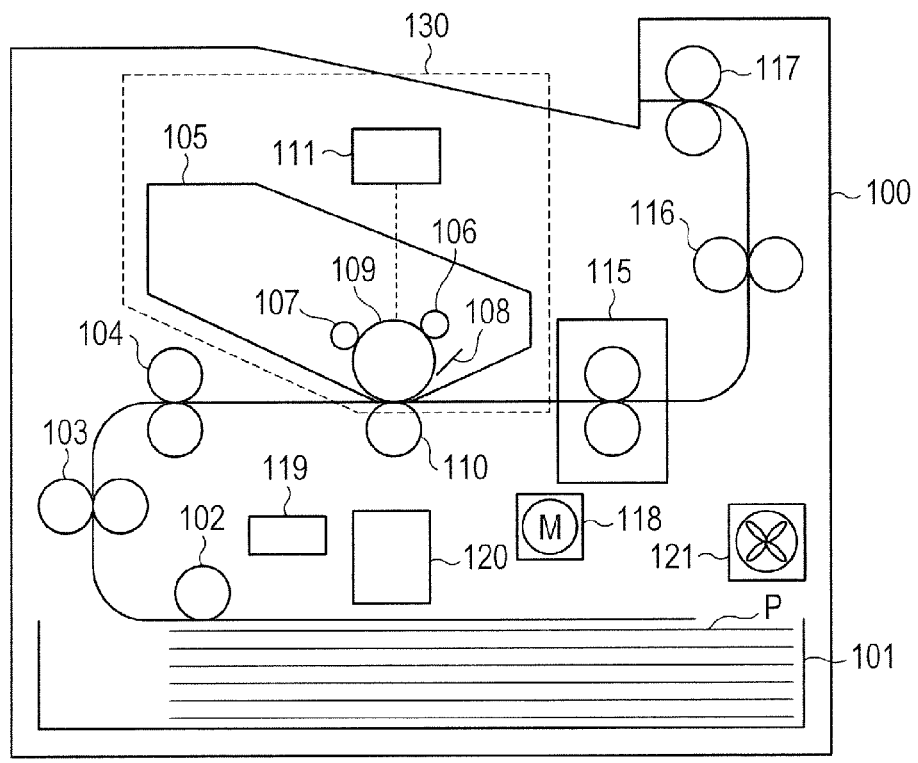
FIGS. 1A and 1B illustrate an image forming apparatus and a configuration of a rotation speed changing section according to first to fifth embodiments.

FIG. 1A is a diagram illustrating an outline of configuration of an image forming apparatus 100 according to a first embodiment. A recording sheet P that is a recording material loaded on a paper feeding cassette 101 is conveyed to a process cartridge 105 at a predetermined timing through a pickup roller 102, paper feeding rollers 103 and registration rollers 104. The process cartridge 105 is integrally formed by: a charger 106 that is a charging unit; a developing device 107 that is a developing unit; a cleaning apparatus 108 that is a cleaning unit; and a photosensitive drum 109. A series of publicly known electrophotographic processes are executed by a laser beam emitted from a scanner 111 that is an exposure unit, and an unfixed toner image is formed on the photosensitive drum 109. When a transfer roller 110 that is a transfer unit transfers the unfixed toner image on the photosensitive drum 109 to the recording sheet P, a fixing apparatus 115 that is a fixing unit heats and pressurizes the recording sheet P to fix the unfixed toner image to the recording sheet P. The recording material P is then discharged to the outside of the main body of the image forming apparatus 100 through intermediate paper discharge rollers 116 and paper discharge rollers 117, and the series of image forming operation (hereinafter, also called print operation) is finished.

The process cartridge 105 and the scanner 111 serve as an image forming section 130 that is an image forming unit. The paper feeding rollers 103, the registration rollers 104, the intermediate paper discharge rollers 116 and the paper discharge rollers 117 serve as a conveyor that is a conveyance unit. A motor 118 provides driving force to units including the fixing apparatus 115. A controller 119 is a control board provided with electric circuits including a CPU 201 (see FIG. 1B) which is a control unit that controls the main body of the image forming apparatus 100. A power supply apparatus 120 generates a DC voltage of 24 V and supplies power to drive system apparatuses, such as the fixing apparatus 115 and the motor 118. The controller 119 is driven by a DC voltage of 5 V supplied from a power supply apparatus not illustrated. A fan motor 121 that is a cooling unit cools components of the power supply apparatus 120. The image forming apparatus 100 operates in one of a print state for forming an image on the recording sheet P, a standby state for immediately shifting to the print state when a job is received, and a sleep state in which the power consumption is lower than in the print state and the standby state.

[Configuration of Rotation Speed Changing Section of Fan Motor]

Figure 1B:
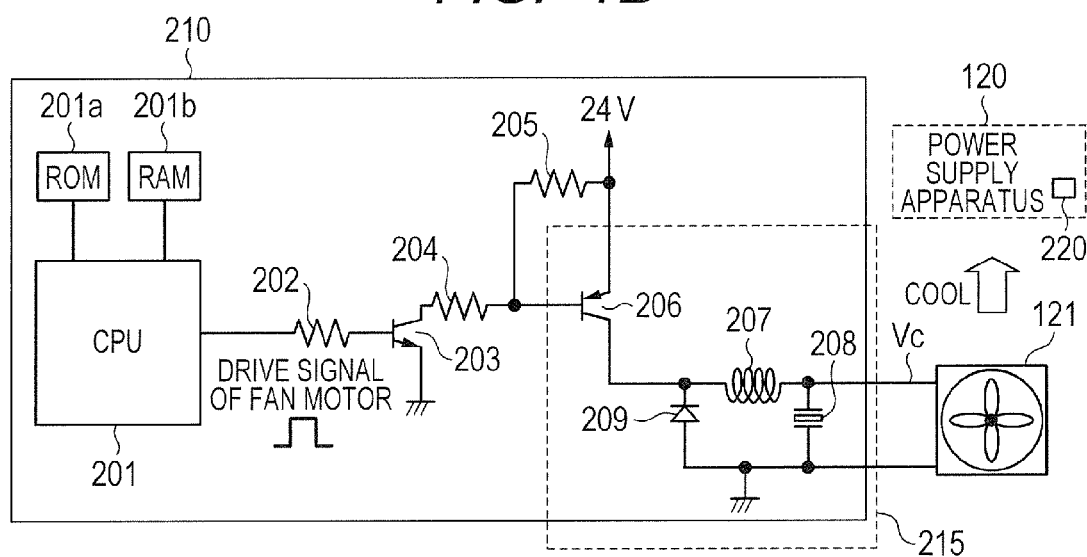

FIG. 1B is a diagram illustrating a configuration of a rotation speed changing section 210 that is a rotation speed changing unit of the fan motor 121 that drives a fan of the present embodiment. The drive source of the rotation speed changing section 210 of the fan motor 121 is the DC voltage of 24 V generated by the power supply apparatus 120. The rotation speed changing section 210 includes: the CPU 201 in the controller 119; and transistors 203 and 206 and resistances 202, 204 and 205 forming a Darlington connection. The CPU 201 of the rotation speed changing section 210 performs switching operation that is operation for connecting and disconnecting the supply of the DC voltage of 24 V from the power supply apparatus 120 to the fan motor 121. The CPU 201 performs various controls of the image forming apparatus 100 according to various programs stored in a ROM 201a, while using a RAM 201b as a work area.

The CPU 201 is connected to the base terminal of the transistor 203 through the resistance 202, and the base terminal of the transistor 206 is connected to the collector terminal of the transistor 203 through the resistance 204. The emitter terminal of the transistor 203 is grounded. The CPU 201 outputs a drive signal (illustrated as a fan motor drive signal) for rotating the fan motor 121 to the base terminal of the transistor 203. The resistance 205 is connected between the base terminal and the emitter terminal of the transistor 206. The DC voltage of 24 V output from the power supply apparatus 120 is connected to the emitter terminal of the transistor 206. A step-down DC-DC converter 215 is connected to the collector terminal of the transistor 206. The step-down DC-DC converter 215 includes a diode 209, an inductor 207 and an electrolytic capacitor 208. The rotation speed changing section 210 of the fan motor 121 serves as part of the functions of the controller 119. In this way, the CPU 201 can change an input voltage Vc for the fan motor 121 in a range of 0 V to 24 V according to the frequency or on-duty of the drive signal of the fan motor 121.

In the case described in the present embodiment, the fan motor 121 is mainly used to cool an FET 220 that is a portion to be cooled (also called cooling target unit) which is a component of the power supply apparatus 120. The portion to be cooled is not limited to the FET 220. In a switching regulator circuit (not illustrated) in the power supply apparatus 120, the FET 220 is used to switch the supply of current to a transformer included in the switching regulator circuit. A switching period of the switching operation of the FET 220 decreases with an increase in the current consumption of the fixing apparatus 115, the motor 118 and the like, and the switching loss increases. As a result, the temperature of the FET 220 rises. In the image forming apparatus 100, the current consumption of the fixing apparatus 115, the motor 118 and the like increases during the print operation, and the temperature of the FET 220 rises. The fan motor 121 includes a bearing, a blade (fan), winding, a magnet, a frame and electric components necessary for controlling revolutions, and the rotation speed changes according to the input voltage.

[Relationship Between Input Voltage of Fan Motor and Drive Frequency]

Figure 2A:
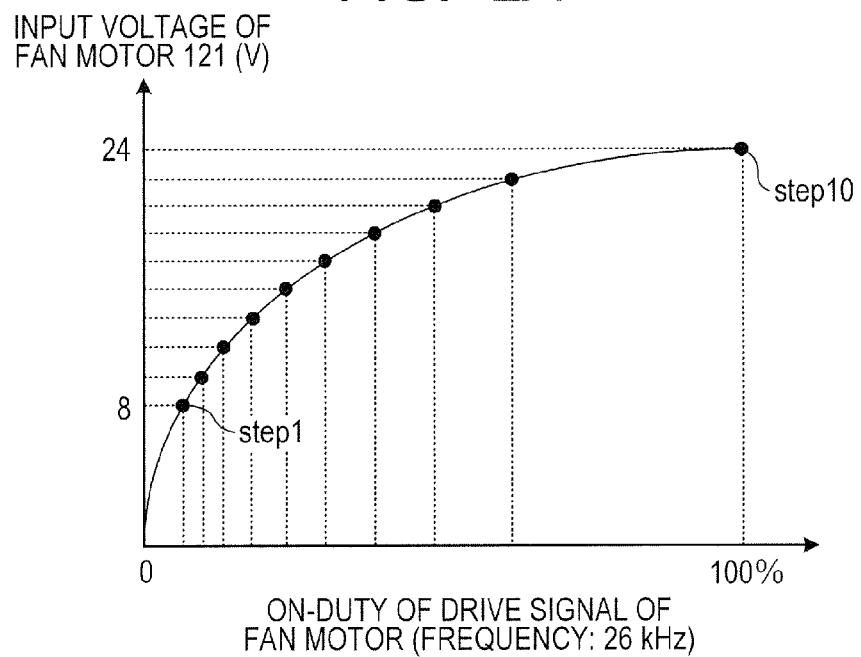
FIGS. 2A and 2B illustrate a relationship between input voltage and drive frequency of a fan motor and a relationship between the input voltage, the rotation speed and operation sound of the fan motor according to the first to fifth embodiments.

FIG. 2A is a graph illustrating a relationship between the input voltage of the fan motor 121 and the drive frequency according to the present embodiment. The horizontal axis of FIG. 2A indicates the on-duty (%) of the drive signal of the fan motor 121 when the drive frequency of the fan motor 121 is 26 kHz, and the vertical axis indicates the input voltage (V) of the fan motor 121. As illustrated in FIG. 2A, it can be understood that the input voltage of the fan motor 121 changes in a logarithmic manner (0 to 24 V) according to the on-duty (0 to 100%) of the drive signal of the fan motor 121. The input voltage of the fan motor 121 is 24 V when the on-duty of the drive signal of the fan motor 121 is 100%. FIG. 2A illustrates an example in which the CPU 201 changes the input voltage of the fan motor 121 from 8 V to 24 V in 10 stages of step 1 to step 10. In the present embodiment, the input voltage of the fan motor 121 is divided into nine equal parts from 8 V to 24 V ((24−8)/(10−1)) (about every 1.8 V), for example.

[Relationship Between Input Voltage, the Rotation Speed, and Operation Sound of Fan Motor]

Figure 2B:
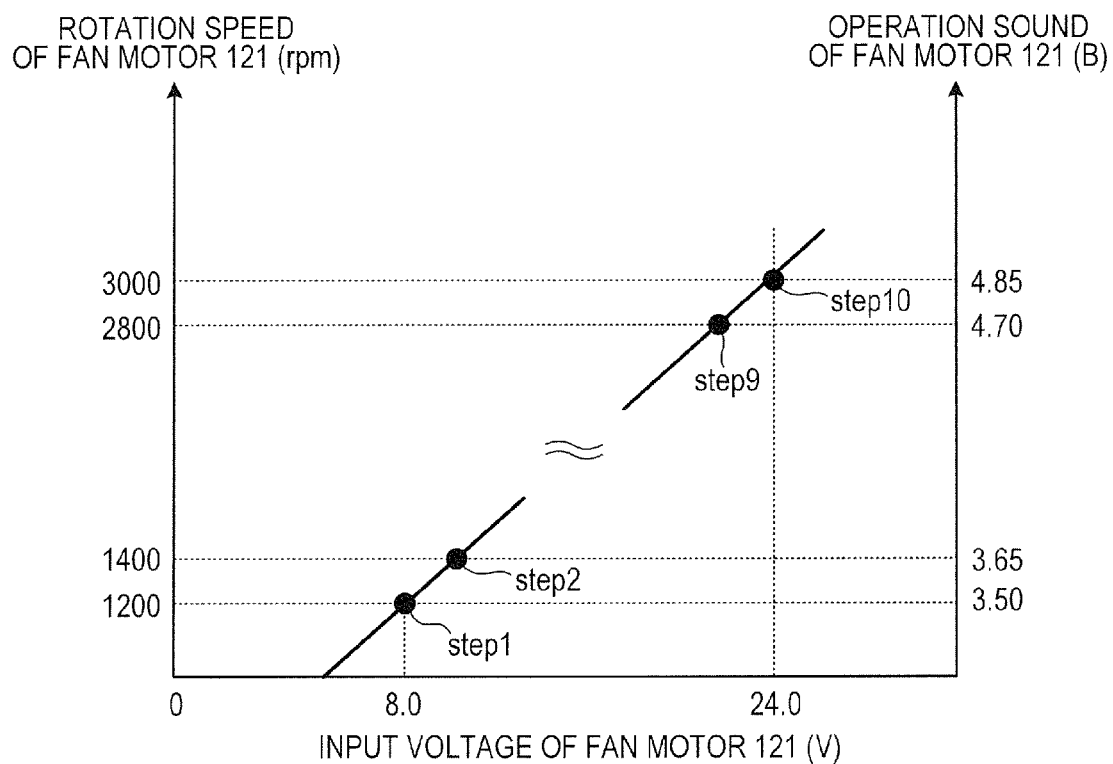

FIG. 2B is a graph illustrating a relationship between the input voltage, the rotation speed, and the operation sound of the fan motor 121 according to the present embodiment. The horizontal axis indicates the input voltage (V) of the fan motor 121. The left vertical axis indicates the rotation speed (rpm (rotations per minute)) of the fan motor 121. The right vertical axis indicates the operation sound (B (bel)) of the fan motor 121. In FIG. 2B, step 1 to step 10 are step numbers described in FIG. 2A. The step numbers are set such that the operation sound linearly changes every 0.15 B when the rotation speed of the fan motor 121 is changed every 200 rpm from 1200 rpm to 3000 rpm. In the present embodiment, the drive of the fan motor 121 is stable with the rotation speed of up to 3000 rpm. Hereinafter, the rotation speed of the fan motor 121 will be expressed by the step number.

[Relationship Between the Rotation Speed of Fan Motor and Temperature of FET]

FIGS. 3A and 3B illustrate a relationship between a time chart of the rotation speed of the fan motor 121 and the temperature of the FET 220 of the power supply apparatus 120 according to the present embodiment. FIGS. 3A and 3B illustrate one of the embodiments in a control process of the fan motor 121 according to the present embodiment described later. The temperature of the FET 220 is an example in the time chart of the rotation speed of the fan motor 121. In FIG. 3A, the left vertical axis indicates the rotation speed (rpm) of the fan motor 121, and the right vertical axis indicates the input voltage (V) of the fan motor 121. In FIG. 3B, the vertical axis indicates the temperature (° C.) of the FET 220, and the horizontal axis indicates the time (sec (second)).

In the case described in the present embodiment, the controller 119 of the image forming apparatus 100 receives jobs for forming images on one or a plurality of recording sheets P. The jobs received by the controller 119 will be called a first job, a second job and a third job in the order of reception. The timing of the start of the first job is T=0 sec (second). At T=0 sec, the image forming apparatus 100 shifts from the standby state to the print state. The temperature of the FET 220 at T=0 sec is 40° C. as illustrated in FIG. 3B. Hereinafter, the temperature of 40° C. that is the temperature of the FET 220 in the standby state after sufficient cooling of the FET 220 will be called an initial temperature during standby.

From T=0 sec to T_init=20 sec, the fan motor 121 is driven in step 1 (1200 rpm, 8 V) that is a first rotation speed indicating the lowest rotation speed. The first job ends at T_init=20 sec. In this case, the temperature of the FET 220 rises from 40° C., which is the initial temperature during standby, to 70° C. T=20 to 40 sec is a cooling period after the end of the first job, and the period will be called a cooling period T_cool. The temperature of the FET 220 has risen to 70° C., and cooling of the FET 220 is insufficient if the rotation speed of the fan motor 121 remains in step 1. Therefore, the fan motor 121 cools the FET 220 with the rotation speed of step 4 (1800 rpm, 13.3 V).

At T=40 sec, the second job is started. At this point, the temperature of the FET 220 is 60° C. The fan motor 121 increases the step number by one from step 4 (1800 rpm, 13.3 V) at each holding time of the rotation speed of the fan motor 121. Hereinafter, the holding time that is a time for holding the rotation speed, i.e. each step, of the fan motor 121 will be called T_st, and in the present embodiment, T_st is 10 sec, for example. The second job ends at T=70 sec. When the second job ends at T=70 sec, the fan motor 121 is driven in step 7 (2400 rpm, 18.7 V), and the temperature of the FET 220 reaches 85° C. After the end of the second job, the fan motor 121 is still driven in step 7 (2400 rpm, 18.7 V) in the cooling period T_cool, and the temperature of the FET 220 is cooled to 50° C. between the end of the second job and T=110 sec.

The third job is started at T=110 sec. At this point, the rotation speed of the fan motor 121 decreases from step 7 (2400 rpm, 18.7 V) to step 3 (1600 rpm, 11.6 V). When the third job is started, the rotation speed of the fan motor 121 increases from step 3 (1600 rpm, 11.6 V) at each holding time T_st=10 sec. At T=180 sec, the rotation speed of the fan motor 121 is step 10 (3000 rpm, 24 V). At T=200 sec, the temperature of the FET 220 reaches 100° C. that is a saturation temperature. The third job ends at T=220 sec. After the end of the third job at T=220 sec, the fan motor 121 is still driven in step 10 (3000 rpm, 24 V), which is a second rotation speed, in the cooling period T_cool. The FET 220 is cooled to 40° C. that is the initial temperature during standby, until the image forming apparatus 100 shifts from the print state to the standby state at T=280 sec. At T=280 sec, the rotation speed of the fan motor 121 is lowered from step 10 to step 1.

[Relationship Between Temperature Counter and Temperature of FET]

FIGS. 4A and 4B are a diagram illustrating a relationship between a time chart of a temperature counter of the FET 220 and the temperature of the FET 220 of the power supply apparatus 120 according to the present embodiment. The vertical axis of FIG. 4A indicates the temperature counter. The vertical axis of FIG. 4B indicates the temperature (° C.) of the FET 220, and the horizontal axis indicates the time (sec). The CPU 201 includes the temperature counter of the FET 220 and includes a table for converting the temperature of the FET 220 measured in advance and a temperature counter value. The CPU 201 refers to the temperature counter value and the table to predict the temperature of the FET 220 and controls the rotation speed of the fan motor 121 based on the predicted temperature of the FET 220. The table with information associating the temperature of the FET 220 and the temperature counter value (in other words, passing of time) is stored in the ROM 201a. Here, the temperature counter value is N. When the print state is shifted to the standby state after the end of the previous job, the CPU 201 starts counting the temperature counter value N and raises N by one count every 1 sec. The CPU 201 determines the temperature of the FET 220 based on the temperature counter value N in the operating state of the image forming apparatus 100 at the determination of the temperature of the FET 220 and based on the step number that is the rotation speed of the fan motor 121. Since the temperature counter value N is counted every 1 sec, the temperature counter value N indicates an elapsed time from the shift from the print state to the standby state.

At time T=0 sec with the start of the first job, the CPU 201 determines whether the temperature counter value N is equal to or greater than 60. In the present embodiment illustrated in FIGS. 4A and 4B, the temperature counter value N is equal to or greater than 60 (N≥60) at T=0 sec. Therefore, the CPU 201 determines that the temperature of the FET 220 is cooled to the initial temperature during standby (40° C.) and starts counting after setting the temperature counter value N to 0. Here, it is measured and checked in advance that the temperature of the FET 220 is equal to or lower than the initial temperature during standby (40° C.) if the value of the temperature counter value N from the standby state after the end of the previous job is equal to or greater than 60. Therefore, the CPU 201 can correctly determine the temperature of the FET 220 based on the temperature counter value N. Subsequently, the CPU 201 determines the temperature of the FET 220 based on the temperature counter value N to thereby control the rotation speed of the fan motor 121.

When the first job ends at T=20 sec, i.e. when the temperature counter value N is 20, the CPU 201 determines that the temperature of the FET 220 is 70° C. and starts counting after setting the temperature counter value to N=0. More specifically, the CPU 201 determines the temperature of the FET 220 based on the temperature counter value N and the information of the table stored in the ROM 201a. The same applies hereinafter, and the detailed description will not be repeated. Until T=40 sec, i.e. until the temperature counter value N is 20, the CPU 201 performs the cooling operation of the FET 220 by the fan motor 121 in the cooling period T_cool. The cooling operation performed in the cooling period T_cool after the end of the job will be simply called cooling operation. At time T=40 sec with the start of the second job, i.e. when the temperature counter value N is 20, the CPU 201 determines that the temperature of the FET 220 is 60° C. and starts counting after setting the temperature count value to N=0. At time T=70 sec with the end of the second job, i.e. when N=30, the CPU 201 determines that the temperature of the FET 220 is 85° C. and starts counting after setting N=0. Until T=110 sec, i.e. until the temperature counter value N is 40, the CPU 201 performs the cooling operation of the FET 220 by the fan motor 121 in the cooling period T_cool.

At time T=110 sec with the start of the third job, i.e. when the temperature counter value N is 40, the CPU 201 determines that the temperature of the FET 220 is 50° C. and starts counting after setting N=0. At T=200 sec, i.e. when the temperature counter value N is 90, the temperature of the FET 220 reaches the saturation temperature and is 100° C. At time T=220 sec with the end of the third job, i.e. when the temperature counter value N is 110, the CPU 201 determines that the temperature of the FET 220 is 100° C. and starts counting after setting N=0. Until T=280 sec, i.e. until the temperature counter value N is 60, the CPU 201 performs the cooling operation by the fan motor 121 in the cooling period T_cool. The fan motor 121 cools the FET 220 until the temperature counter value N is 60, and the FET 220 is cooled to the initial temperature during standby (40° C.). As a result, the rotation speed of the fan motor 121 shifts to step 1 at T=280 sec, and the image forming apparatus 100 enters the standby state.

[Control Process of the Rotation Speed of Fan Motor]

Figure 5:
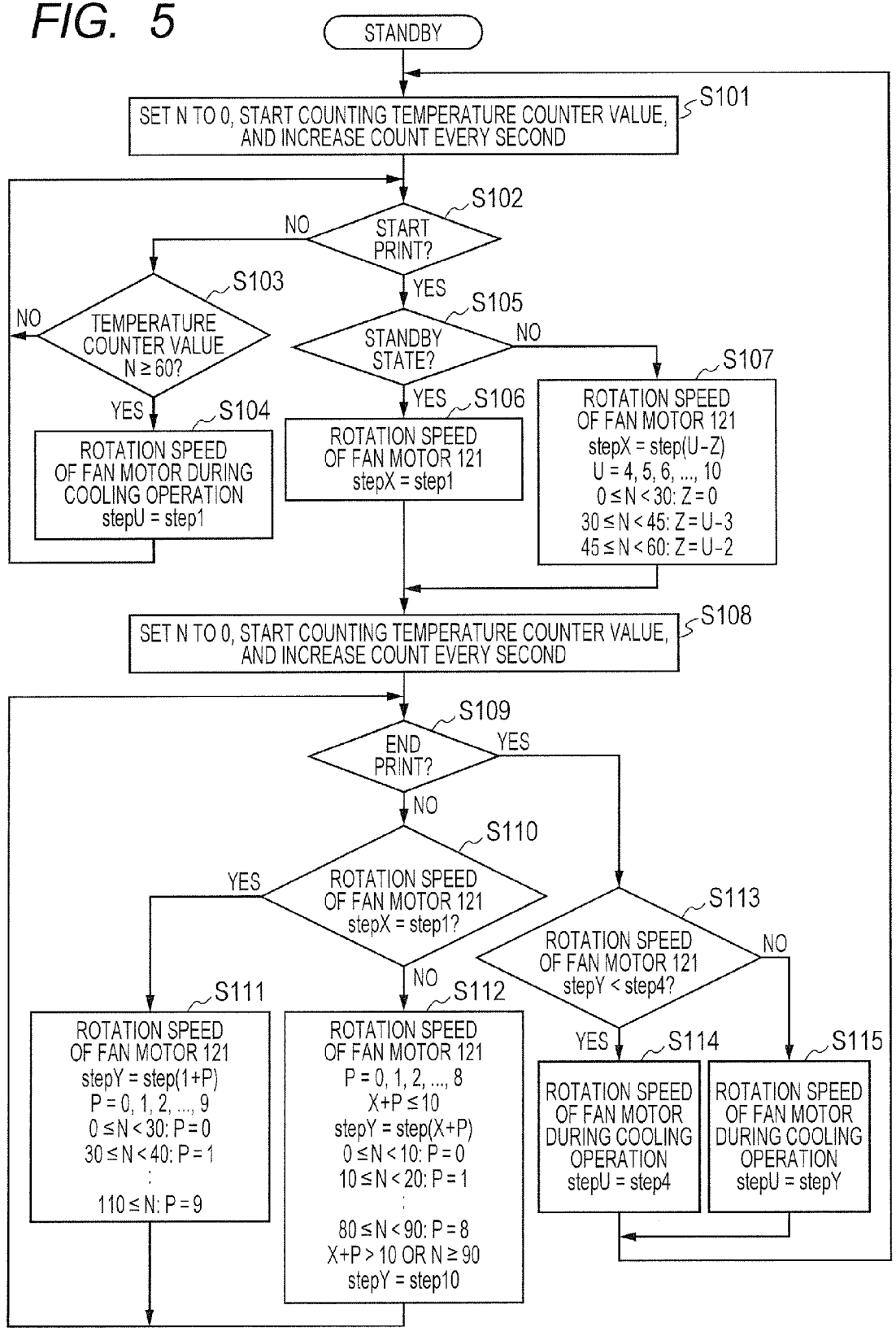
FIG. 5 is a flow chart illustrating a control process of the rotation speed of the fan motor according to the first embodiment.
Figure 7:
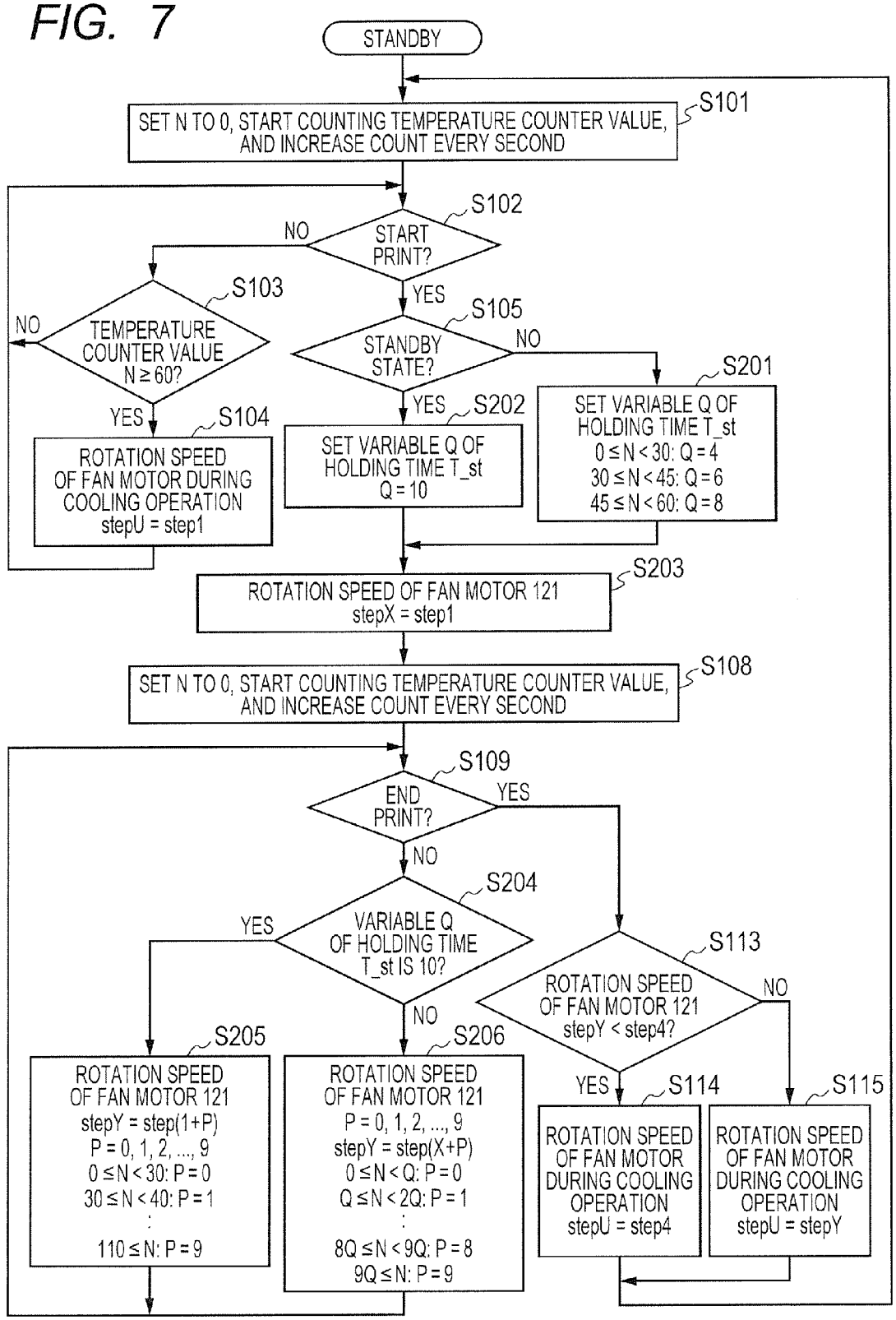
FIG. 7 is a flow chart illustrating a control process of the rotation speed of the fan motor according to the second embodiment.
Figures 8, 8A:
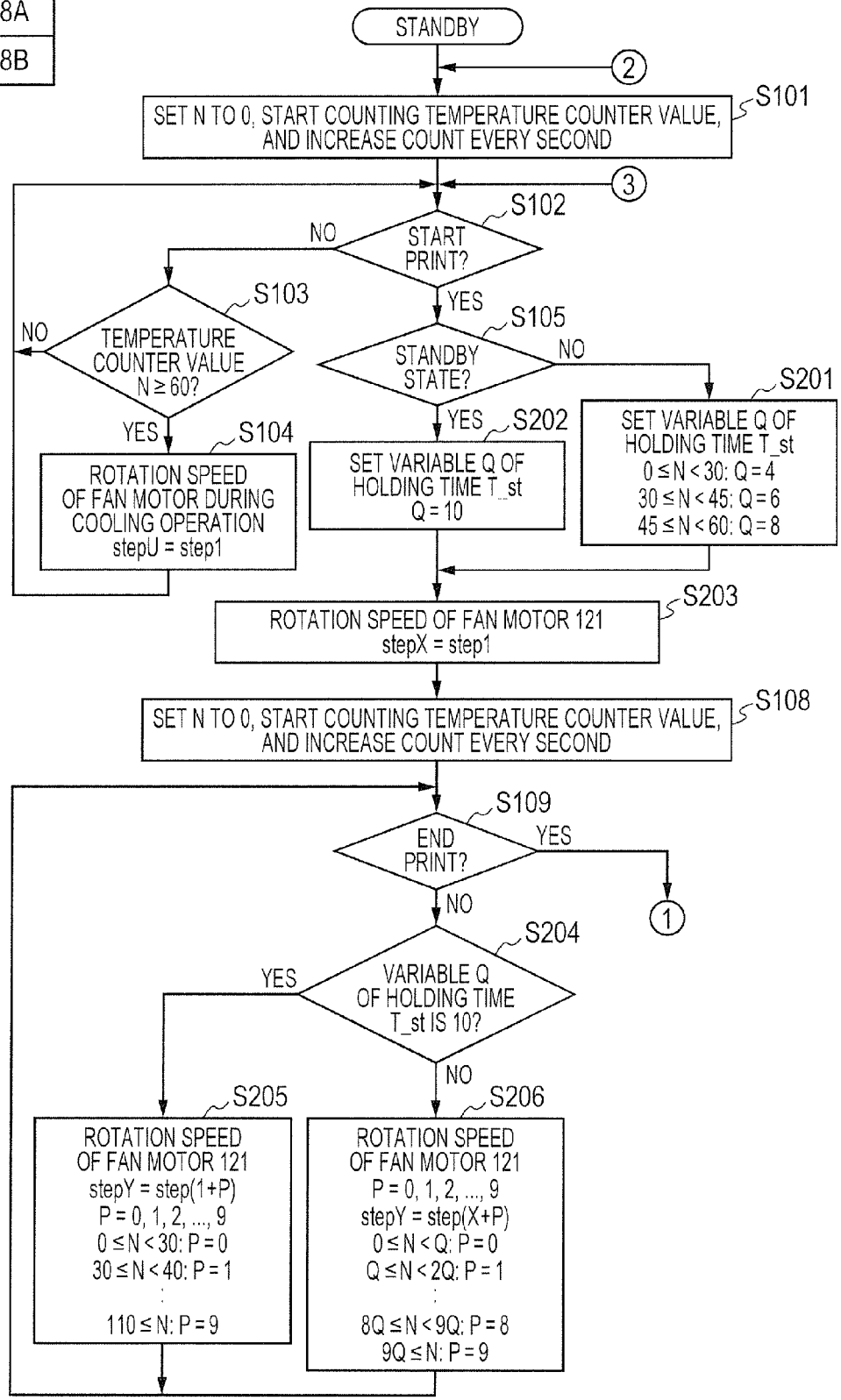
FIG. 8 composed of FIGS. 8A and 8B is a flow chart illustrating a control process of the rotation speed of the fan motor according to the third embodiment.
Figure 8B:
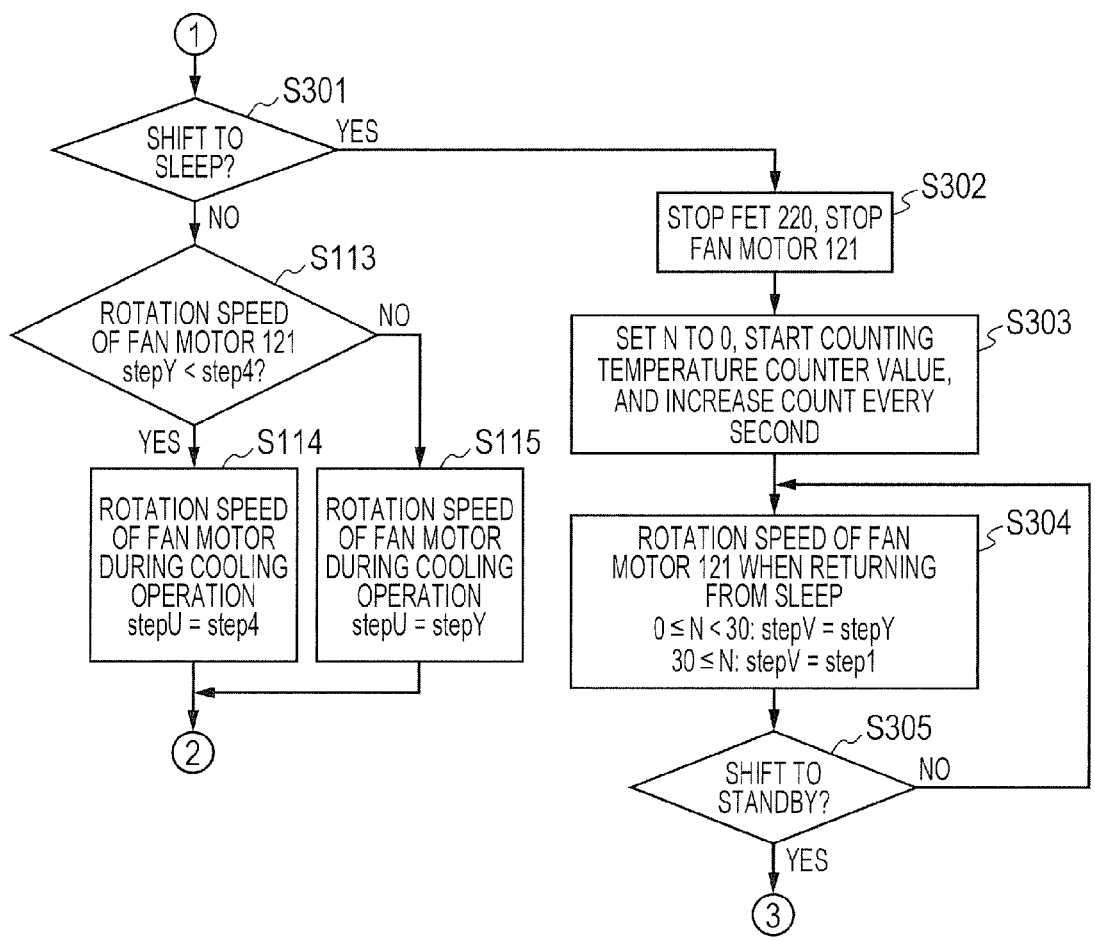

FIG. 5 is a flow chart illustrating a control process of the rotation speed of the fan motor 121 according to the present embodiment. Hereinafter, processes of FIGS. 5, 7 and 8 are controlled and determined by the CPU 201. The rotation speed of the fan motor 121 is step X at the start of printing, is step Y in the print operation, and is step U during the cooling operation. In the control process of the rotation speed of the fan motor 121 according to the present embodiment, the rotation speed of the fan motor 121 is controlled as follows if the cooling operation after the end of the previous job is not sufficiently performed, and the temperature of the FET 220 does not return to the initial temperature during standby (40° C.). More specifically, the rotation speed of the fan motor 121 at the start of the next job is raised to step 2 or higher.

The process of FIG. 5 is started when the image forming apparatus 100 enters the standby state. In step (hereinafter, called "S") 101, the CPU 201 sets the temperature counter value N to 0 and starts counting the temperature counter value N. The CPU 201 raises the temperature counter value N by 1 every second. In S102, the CPU 201 monitors the presence or absence of a command for starting the print to determine whether to start the print operation. In S102, if the CPU 201 determines that there is no instruction for starting the print, the CPU 201 proceeds to the process of S103. In S103, the CPU 201 determines whether the temperature counter value N is N≥60. If the CPU 201 determines in S103 that the temperature counter value N is not N≥60, i.e. N<60, the CPU 201 returns to the process of S102. On the other hand, if the CPU 201 determines in S103 that the temperature counter value N is N≥60, the CPU 201 determines that the temperature of the FET 220 is equal to or lower than 40° C. that is the initial temperature during standby and proceeds to the process of S104. In S104, the CPU 201 sets the rotation speed of the fan motor 121 during the cooling operation to step 1 and returns to the process of S102.

If the CPU 201 determines in S102 that there is an instruction for starting the print, i.e. if the CPU 201 determines to start the print operation, the CPU 201 determines in S105 whether the state is the standby state based on the temperature counter value N. As described, the CPU 201 refers to the temperature counter value N to determine that the state is the standby state if the temperature counter value N is equal to or greater than 60 and to determine that the state is not the standby state if the temperature counter value N is less than 60. If the CPU 201 determines in S105 that the temperature counter value N is equal to or greater than 60 and that the state is the standby state, the CPU 201 determines that the temperature of the FET 220 is cooled to 40° C., which is the initial temperature during standby, or lower in the cooling operation after the end of the previous job. Therefore, the CPU 201 drives the fan motor 121 in step 1 (step X=step 1) in S106.

On the other hand, if the CPU 201 determines in S105 that the temperature counter value N is smaller than 60 and that the state is not the standby state, the CPU 201 determines that the temperature of the FET 220 is not cooled to 40° C., which is the initial temperature during standby, in the cooling operation after the end of the previous job. Therefore, in S107, the CPU 201 raises the rotation speed (step X) of the fan motor 121 at the start of printing to step 2 or higher according to step U that is the step number of the fan motor 121 during the cooling operation of the previous job and according to the current temperature counter value N. In the process of S107, the CPU 201 determines the rotation speed of the fan motor 121 at the start of the image forming operation based on the rotation speed of the fan motor 121 at the start of the period of the cooling operation before the start of the image forming operation. A specific example of the rotation speed (step X) of the fan motor 121 at the start of printing that is set by the CPU 201 in S107 is illustrated below.

$$\text{step } X = \text{step}(U-Z)$$

U=4, 5, 6, . . . , 10
0≤N<30: Z=0
30≤N<45: Z=U−3
45≤N<60: Z=U−2

In this way, the CPU 201 sets the rotation speed (step X) of the fan motor 121 at the start of printing to a greater value when the temperature counter value N is smaller, i.e. when the elapsed time from the end of the previous job is shorter, to increase the effect of cooling by the fan motor 121.

For example, at the start of the third job of FIGS. 3A and 3B, the step number (step U) during the cooling operation of the second job that is the previous job is step 7, and U is 7. Since the temperature counter value N is 40, Z=U−3=7−3=4. Therefore, the step number (step X) at the start of printing is step (U−Z)=step (7−4)=step 3.

In this way, one of Z=0, Z=U−3 and Z=U−2 is selected according to the value of the temperature counter value N, and as a result, the value of the step number (step X) of the fan motor 121 at the start of printing is determined. Here, the rotation speed of the fan motor 121 at the start of printing is changed according to the value of the temperature counter value N (0 to 60) after the end of the previous job. The larger the value of the temperature counter value N, the lower the temperature of the FET 220 determined by the CPU 201. Therefore, a small value is set for the step number at the start of the next job. Here, step U during the cooling operation is a step number during the cooling operation after the end of the previous job. When the rotation speed (step U) of the fan motor 121 is a rotation speed lower than step 4 during the cooling operation, the air flow is small, and the temperature of the FET 220 cannot return to the initial temperature during standby (40° C.) even when the value of the temperature counter value N is equal to or greater than (N≥60). Therefore, the rotation speed (step U) of the fan motor 121 during the cooling operation is set to step 4 or higher (4≤U≤10). The determination process of step U will be described later in S113 to S115.

In S108, the CPU 201 starts counting after setting the temperature counter value N to 0 and raises the count every 1 sec. In S109, the CPU 201 determines whether the print operation is finished by monitoring whether there is a command for the print operation. If the CPU 201 determines in S109 that the print operation is not finished, i.e. if the CPU 201 determines to continue the print operation, the CPU 201 proceeds to the process of S110. In S110, the CPU 201 determines whether the rotation speed (step X) of the fan motor 121 at the start of printing is step 1. If the CPU 201 determines in S110 that the rotation speed (step X) of the fan motor 121 at the start of printing is step 1, the CPU 201 determines that the temperature of the FET 220 is the initial temperature during standby (40° C.) and proceeds to the process of S111. In S111, the CPU 201 refers to the temperature counter value N to determine the rotation speed (step Y) of the fan motor 121 in the print operation as follows.

step $Y=\text{step}(1+P)$

P=0, 1, 2, . . . , 9
0≤N<30: P=0
30≤N<40: P=1
40≤N<50: P=2
50≤N<60: P=3
60≤N<70: P=4
70≤N<80: P=5
80≤N<90: P=6
90≤N<100: P=7
100≤N<110: P=8
110≤N: P=9

As a result, if the step number (step X) at the start of the print operation is step 1, step 1 is maintained while the temperature counter value N is N<30, and T_init described above is secured. In this case, one of P=0 to 9 is selected according to the value of the temperature counter value N, and as a result, the value of the step number (step Y) of the fan motor 121 in the print operation is determined. If the temperature counter value N is equal to or greater than 110, step Y is set to step 10. Here, the temperature of the FET 220 increases with an increase in the temperature counter value N. Therefore, the step number is changed in stages to prevent a rapid temperature change of the FET 220 while suppressing the operation sound caused by the wind noise of the fan motor 121. Here, if the temperature counter value is equal to or greater than 30, the rotation speed of the fan motor 121 rises, up to step 10, every time the temperature counter value N increases by 10 (T_st=10), unless the print is finished.

On the other hand, if the CPU 201 determines in S110 that the rotation speed (step X) of the fan motor 121 at the start of printing is not step X=step 1, the CPU 201 proceeds to the process of S112. In S112, the CPU 201 determines that the temperature of the FET 220 is higher than 40° C. that is the initial temperature during standby. In S112, the CPU 201 sets the rotation speed (step Y) of the fan motor 121 in the print operation as follows.

step $Y=\text{step}(X+P)$

P=0, 1, 2, . . . , 8
If X+P≤10,
0≤N<10: P=0
10≤N<20: P=1
20≤N<30: P=2
30≤N<40: P=3
40≤N<50: P=4
50≤N<60: P=5
60≤N<70: P=6
70≤N<80: P=7
80≤N<90: P=8
If X+P>10 or if N≥90
step Y=step 10

For example, in the third job of FIGS. 3A and 3B, the step number (step X) at the start of printing is step 3, and X is 3. If the temperature counter value N is 10, P is 1. Therefore, the step number (step Y) in the print operation is step (X+P)=step (3+1)=step 4. Subsequently, the rotation speed of the fan motor 121 increases to step 5, step 6 and so forth, every time the temperature counter value N rises by 10. When the temperature counter value N is 70, P is 7, and X+P=3+7=10. The step number (step Y) in the print operation reaches step 10. Subsequently, the step number (step Y) in the print operation is maintained in step 10 until the end of the third job.

In this way, when X+P is equal to or smaller than 10, one of P=0 to 8 is selected according to the value of the temperature counter value N, and as a result, the value of the rotation speed (step Y) of the fan motor 121 in the print operation is determined. In the process of S112, it is determined that the temperature of the FET 220 at the start of printing is higher (50° C. in the third job of FIGS. 3A and 3B) than in the process of S111, and the step number is changed in stages, from a large step number, in a shorter time than in S111.

If the CPU 201 determines in S109 that the print operation is finished, the CPU 201 proceeds to the process of S113. In S113, the CPU 201 determines whether the rotation speed of the fan motor 121 at the start of printing is step Y<step 4.

The determination of S113 is a process for determining the rotation speed of the fan motor 121 at the start of the cooling operation based on the rotation speed of the fan motor 121 at the end of the image forming operation. If the CPU 201 determines in S113 that step Y<step 4, the CPU 201 proceeds to the process of S114. In S114, the CPU 201 sets the rotation speed of the fan motor 121 during the cooling operation to step U=step 4 and returns to the process of S101. For example, in the first job of FIGS. 3A and 3B, the step number (step Y) at the end of printing is step 1. Therefore, the step number (step U) during the cooling operation after the end of the first job is step 4.

On the other hand, if the CPU 201 determines in S113 that step Y is not smaller than step 4, i.e. if the CPU 201 determines that step Y≥step 4, the CPU 201 proceeds to the process of S115. In S115, the CPU 201 sets the rotation speed of the fan motor during the cooling operation to step U=step Y and returns to the process of S101. For example, in the second job of FIGS. 3A and 3B, the step number (step Y) in the print operation at the end of the second job is step 7. Therefore, the step number (step U) during the cooling operation after the end of the second job is step 7. The determination of S113 is for executing the cooling operation with a large rotation speed of the fan motor 121 when the print operation is executed while the FET 220 is not sufficiently cooled at the start of the job. The determination of S113 is a process for preventing the rotation speed (step U) of the fan motor 121 at the start of the cooling operation from becoming lower than the rotation speed of step 4. This prevents a situation in which the temperature of the FET 220 cannot return to the initial temperature of 40° C. due to a small air flow of the fan motor 121, even when the temperature counter value N is equal to or greater than 60.

As described, the rotation speed (step number) of the fan motor 121 is changed in stages according to the temperature of the FET 220 of the power supply apparatus 120 to cool the FET 220 during printing (during job execution) in the present embodiment. Therefore, the operation sound can be reduced in the present embodiment without rapidly changing the wind noise caused by the fan motor 121 during printing.

According to the present embodiment, the noise of the fan motor can be reduced by controlling the fan motor according to the temperature state of the power supply apparatus during printing.

Second Embodiment

In the first embodiment, the holding time T_st of the rotation speed of the fan motor 121 is ten seconds, and the rotation speed is controlled by increasing the step number of the rotation speed of the fan motor 121 by one every ten seconds. In a second embodiment, when the cooling after the end of the previous job is insufficient, and the temperature of the FET 220 does not return to the initial temperature during standby (40° C.), the rotations of the fan motor 121 in the following jobs are controlled based on a holding time T_st shorter than in the first embodiment.

[Relationship Between the Rotation Speed of Fan Motor and Temperature of FET]

Figure 6:
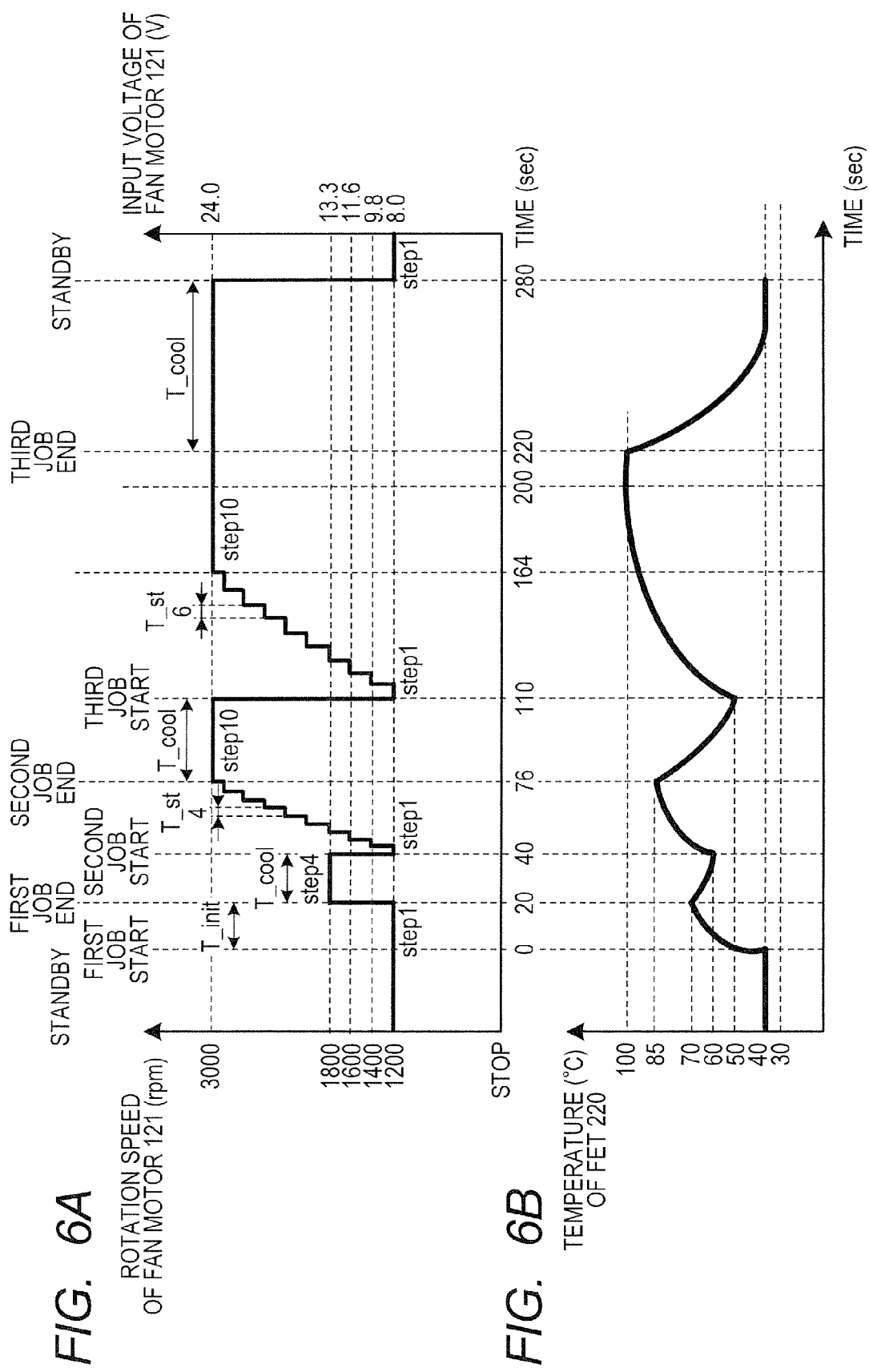
FIGS. 6A and 6B are a diagram illustrating a relationship between the time chart of the rotation speed of the fan motor and the temperature of the FET according to the second embodiment.

FIGS. 6A and 6B illustrate a relationship between the time chart of the rotation speed of the fan motor 121 and the temperature of the FET 220 of the power supply apparatus 120 according to the present embodiment. FIGS. 6A and 6B show one of the embodiments in the control process of the fan motor 121 of the present embodiment described later. The temperature of the FET 220 is an example in the time chart of the rotation speed of the fan motor 121. In FIG. 6A, the left vertical axis indicates the rotation speed (rpm) of the fan motor 121, and the right vertical axis indicates the input voltage (V) of the fan motor 121. In FIG. 6B, the vertical axis indicates the temperature (° C.) of the FET 220, and the horizontal axis indicates the time (sec (second)).

The image forming apparatus 100 shifts from the standby state to the print state when the fan motor 121 is at T=0 sec with the start of the first job. From T=0 sec to T_init=20 sec, the fan motor 121 is driven in step 1 (1200 rpm, 8 V) that is a first rotation speed indicating the lowest rotation speed. The first job ends at T_init=20 sec. At this point, the temperature of the FET 220 rises from the initial temperature during standby (40° C.) to 70°. T=20 to 40 sec is a cooling period after the end of the first job. The FET 220 has risen to 70° C., and cooling of the FET 220 is insufficient if the rotation speed of the fan motor 121 remains in step 1. Therefore, the fan motor 121 cools the FET 220 with the rotation speed of step 4 (1800 rpm, 13.3 V).

The second job is started at T=40 sec. At this point, the temperature of the FET 220 is 60° C. The fan motor 121 increases the step number by one from step 1 (1200 rpm, 8.0 V) at each holding time T_st=4 sec of the rotation speed of the fan motor 121. The second job ends at T=76 sec. When the second job ends at T=76 sec, the fan motor 121 is driven in step 10 (3000 rpm, 24.0 V), and the temperature of the FET 220 reaches 85° C. After the end of the second job, the fan motor 121 is still driven in step 10 (3000 rpm, 24.0 V) in the cooling period T_cool, and the temperature of the FET 220 is cooled to 50° C. between the end of the second job and T=110 sec.

When the third job is started at T=110 sec, the rotation speed of the fan motor 121 is increased by one step number from step 1 at each holding time T_st=6 sec of the rotation speed of the fan motor 121. At T=164 sec, the step number of the fan motor is step 10. At T=200 sec, the temperature of the FET 220 reaches the saturation temperature of 100° C. After the end of the third job at T=220 sec, the fan motor 121 is still driven in step 10 in the cooling period. The FET 220 is cooled to 40° C., which is the initial temperature during standby, from the end of the third job to T=280 sec. The rotation speed of the fan motor 121 drops to step 1.

[Control Process of the Rotation Speed of Fan Motor]

FIG. 7 is a flow chart illustrating a control process of the rotation speed of the fan motor 121 according to the present embodiment. In the present embodiment, the processes of S201 to S203 and S204 to S206 are different from the control process of the rotation speed of the fan motor 121 described in FIG. 5. Therefore, the same processes as in FIG. 5 are designated with the same step numbers, and the description will not be repeated.

In S105, if the CPU 201 determines that the temperature counter value N is equal to or greater than 60 and that the state is the standby state, the CPU 201 determines that the temperature of the FET 220 is cooled to 40° C., which is the initial temperature during standby, or lower in the cooling operation after the end of the previous job. Therefore, in S202, the CPU 201 sets a variable Q of the holding time T_st of the rotation speed of the fan motor 121 to 10 and proceeds to the process of S203.

If the CPU 201 determines in S105 that the temperature counter value N is smaller than 60 and that the state is not the standby state, the CPU 201 determines that the temperature of the FET 220 is not cooled to 40° C., which is the initial temperature during standby, in the cooling operation after the end of the previous job. Therefore, in S201, the CPU 201 changes the variable Q of the holding time T_st of the rotation speed as follows according to the value of the temperature counter value N. In S203, the CPU 201 sets the rotation speed (step X) of the fan motor 121 at the start of printing to step 1 and proceeds to the process of S108.

$0 \leq N < 30$: Q=4
$30 \leq N < 45$: Q=6
$45 \leq N < 60$: Q=8

In this case, one of Q=4, 6 and 8 is selected according to the value of the temperature counter value N, and as a result, the value of the holding time T_st is determined. In this way, the CPU 201 sets the holding time T_st to a shorter time for a smaller temperature counter value N, i.e. for a shorter elapsed time from the end of the previous job, to increase the rotation speed of the fan motor 121 at the start of printing in a short period. This can raise the rotation speed of the fan motor 121 to increase the effect of cooling.

For example, the temperature counter value N is 20 (=40 sec−20 sec) at the start of the second job of FIGS. 6A and 6B, and the variable Q of the holding time T_st is 4. Therefore, the step number indicating the rotation speed of the fan motor 121 is increased every four seconds in the second job. Similarly, the temperature counter value N is 34 (=110−76) at the start of the third job of FIGS. 6A and 6B, and the variable Q of the holding time T_st is 6. As a result, the step number indicating the rotation speed of the fan motor 121 is increased every six seconds in the third job.

In this way, one of Q=4, 6 and 8 is selected according to the value of the temperature counter value N, and as a result, the value of the holding time T_st for updating the step number of the fan motor 121 after the start of the print is determined. Here, the holding time T_st of the rotation speed of the fan motor 121 after the start of the print is changed according to the value of the temperature counter value N ($0 \leq N < 60$) after the end of the previous job. The larger the value of the temperature counter value N, the lower the temperature of the FET 220 determined by the CPU 201. Therefore, the holding time T_st is set to a large value when the next job is started.

In S204, the CPU 201 determines whether the variable Q of the holding time T_st is 10. If the CPU 201 determines that the variable Q of the holding time T_st is 10, the CPU 201 determines that the temperature of the FET 220 is 40° C., which is the initial temperature during standby, and proceeds to the process of S205. In S205, the CPU 201 refers to the temperature counter value N to determine the rotation speed (step Y) of the fan motor 121 in the print operation as follows.

step $Y=step(1+P)$

P=0, 1, 2, . . . , 9
$0 \leq N < 30$: P=0
$30 \leq N < 40$: P=1
$40 \leq N < 50$: P=2
$50 \leq N < 60$: P=3
$60 \leq N < 70$: P=4
$70 \leq N < 80$: P=5
$80 \leq N < 90$: P=6
$90 \leq N < 100$: P=7
$100 \leq N < 110$: P=8
$110 \leq N$: P=9

The CPU 201 returns to the process of S109. In this case, one of P=0 to 9 is selected according to the value of the temperature counter value N, and as a result, the value of step Y is determined.

In S204, if the CPU 201 determines that the variable Q of the holding time T_st of the rotation speed of the fan motor 121 is not 10, the CPU 201 determines that the temperature of the FET 220 is higher than 40° C., which is the initial temperature during standby, and proceeds to the process of S206. In S206, the CPU 201 refers to the temperature counter value N to determine the rotation speed (step Y) of the fan motor 121 in the print operation as follows.

step $Y=step(X+P)$

P=0, 1, 2, . . . , 9
$0 \leq N < Q$: P=0
$Q \leq N < 2Q$: P=1
$2Q \leq N < 3Q$: P=2
$3Q \leq N < 4Q$: P=3
$4Q \leq N < 5Q$: P=4
$5Q \leq N < 6Q$: P=5
$6Q \leq N < 7Q$: P=6
$7Q \leq N < 8Q$: P=7
$8Q \leq N < 9Q$: P=8
$9Q \leq N$: P=9

The CPU 201 returns to the process of S109. In this case, one of P=0 to 9 is selected according to the value of the temperature counter value N, and as a result, the value of step Y is determined. In S206, the temperature of the FET 220 at the start of the control is determined to be higher than in S205, and the step number is changed in stages in the short holding time (T_st=Q) of the rotation speed of the fan motor 121. After the process of S205 or S206, the rotation speed of the fan motor 121 rises, up to step 10, every time the counter N increases by Q, unless the print is finished.

When the cooling of the FET 220 is insufficient in the present embodiment, the holding time T_st of the rotation speed is reduced to reduce the time period for changing the rotation speed of the fan motor 121. For example, the time interval of the holding time T_st may be ten seconds, and the amount of increase in the rotation speed of the fan motor 121 that is set in each step may be changed.

As described, the rotation speed (step number) of the fan motor 121 is changed in stages during printing (during job execution) according to the temperature of the FET 220 of the power supply apparatus 120 to cool the FET 220 in the present embodiment. Particularly, the cooling effect of the FET 220 can be further increased by changing the holding time T_st of the rotation speed of the fan motor 121 according to the temperature of the FET 220 at the start of printing. As a result, the operation sound can be reduced in the present embodiment without rapidly changing the wind noise caused by the fan motor 121 during printing.

As described, according to the present embodiment, the noise of the fan motor can be reduced by controlling the fan motor according to the temperature state of the power supply apparatus during printing.

Third Embodiment

In the first and second embodiments, the rotation speed of the fan motor 121 in the state transition between the standby state and the printing state is controlled. In a third embodiment, the rotation speed of the fan motor 121 is controlled when the state shifts to the sleep state after the end of printing. In the image forming apparatus 100, the power is supplied to the controller 119 in the sleep state. However, the drive of the drive system apparatuses, such as the fixing apparatus 115 and the motor 118, are stopped to reduce the power consumption, and the power supply from the power supply apparatus 120 is also stopped. Therefore, in the third embodiment, the CPU 201 stops the operation of the FET 220 and the fan motor 121 when the state shifts to the sleep state after the end of printing. The CPU 201 controls the rotation speed by changing the rotation speed of the fan motor 121 when the state returns to the standby state, according to the elapsed time from the stop of the fan motor 121.

FIG. 8 is a flow chart illustrating the control process of the rotation speed of the fan motor 121 according to the present embodiment. In FIG. 8, the processes of S301 to S305 are added to the control process of the rotation speed of the fan motor 121 described in FIG. 7. In FIG. 8, the same processes as in FIG. 7 are designated with the same step numbers, and the description will not be repeated. The rotation speed of the fan motor 121 when the state returns to the standby state after the shift to the sleep state will be referred to as step V.

In FIG. 8, if the CPU 201 determines in S109 that the print is finished, the CPU 201 proceeds to the process of S301. In S301, the CPU 201 monitors the presence or absence of a command for starting the sleep to determine whether to shift to the sleep state. If the CPU 201 determines in S301 that there is an instruction for starting the sleep, i.e. if the CPU 201 determines to start shifting to the sleep state, the CPU 201 proceeds to the process of S302. On the other hand, if the CPU 201 determines in S301 that there is no instruction for starting the sleep, the CPU 201 proceeds to the process of S113. In S302, the CPU 201 stops the switching operation by the FET 220 (stop FET 220) to stop the generation of the DC voltage of 24 V in the power supply apparatus 120. The CPU 201 also stops the rotations of the fan motor 121 for cooling the FET 220 (stop fan motor 121).

In S303, the CPU 201 sets the temperature counter value N to N=0 and starts counting the temperature counter value N. The CPU 201 raises the temperature counter value N by 1 every second. In S304, the CPU 201 refers to the temperature counter value N to determine the rotation speed (step V) of the fan motor 121 at the time of the return from the sleep state to the standby state, as follows.

$0 \leq N < 30$: step V=step Y
$30 \leq N$: step V=step 1

Note that step Y indicates the rotation speed of the fan motor 121 at the end of printing. As in the first and second embodiments, the CPU 201 determines the temperature of the FET 220 based on the table for converting the temperature of the FET 220 measured in advance and the temperature counter value. If the temperature counter value N is $N \geq 0$, the CPU 201 determines that the FET 220 is cooled to 40° C. that is the initial temperature during standby. In S305, the CPU 201 monitors the presence or absence of a command of standby start for instructing the shift to the standby state to thereby determine whether to shift to the standby state. If the CPU 201 determines that there is an instruction of standby start in S305, i.e. if the CPU 201 determines to start shifting to the standby state, the CPU 201 returns to the process of S102. On the other hand, if the CPU 201 determines that there is no instruction of standby start in S305, the CPU 201 returns to the process of S304.

Figures 9A, 9B:
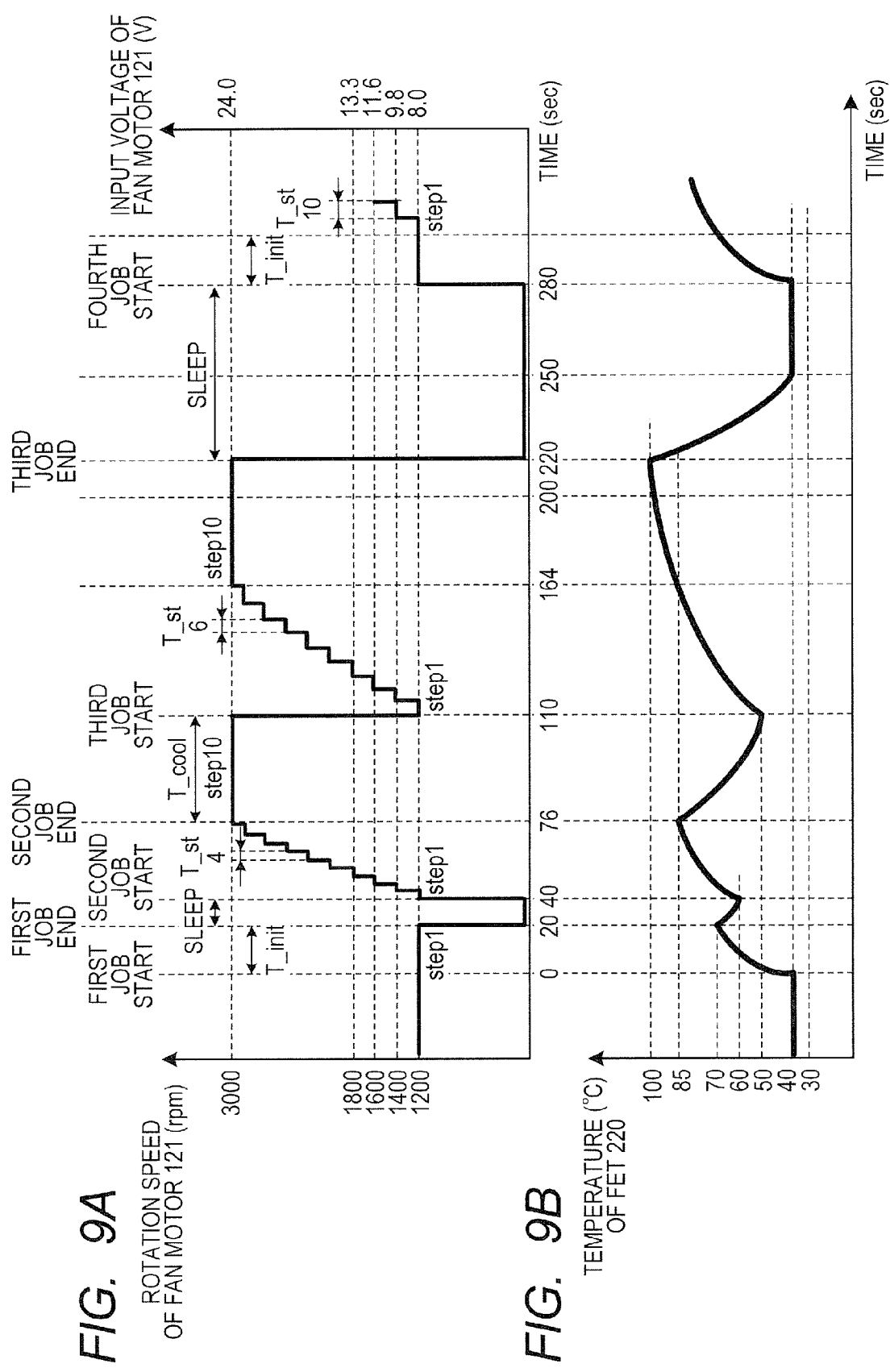
FIGS. 9A and 9B are a diagram illustrating a relationship between the time chart of the rotation speed of the fan motor and the temperature of the FET according to the third embodiment.

FIGS. 9A and 9B illustrate a relationship between the time chart of the rotation speed of the fan motor 121 and the temperature of the FET 220 of the power supply apparatus 120 according to the present embodiment. The temperature of the FET 220 is an example in the time chart of the rotation speed of the fan motor 121. In FIG. 9A, the left vertical axis indicates the rotation speed (rpm) of the fan motor 121, and the right vertical axis indicates the input voltage (V) of the fan motor 121. In FIG. 9B, the vertical axis indicates the temperature (° C.) of the FET 220, and the horizontal axis indicates the time (sec (second)). FIGS. 9A and 9B are different from FIGS. 6A and 6B in that periods in which the state is shifting to the sleep state are included between the end of the first job and the start of the second job and between the end of the third job and the start of the fourth job. Therefore, the periods in which the state is shifting to the sleep state will be described, and the description of the same periods as in FIGS. 6A and 6B will not be repeated.

In FIG. 9A, when the first job ends at T=20 sec in which the rotation speed (step Y) of the fan motor 121 in the print operation is in the state of step 1, the state shifts to the sleep state. The switching operation of the FET 220 is stopped, and the fan motor 121 is stopped. At T=40 sec, the state returns from the sleep state to the standby state, and the second job is started. In this case, the sleep time that is the operation stop time of the fan motor 121 (that is also the value of the temperature counter value N) is 20 sec (=40 sec−20 sec), and the temperature of the FET 220 is 60° C. exceeding the initial temperature during standby (40° C.) (FIG. 9B). Therefore, the rotation speed (step V) of the fan motor 121 at the start of the second job after returning from the sleep state is step 1 (=step Y) because the temperature counter value N is 20. The variable Q of the holding time T_st for updating the step number of the fan motor 121 after the start of the second job is set to Q=4 because the value of the temperature counter value N is 20.

When the third job ends at T=220 sec in which the rotation speed (step Y) of the fan motor 121 in the print operation is in the state of step 10, the state shifts to the sleep state. The switching operation of the FET 220 is stopped, and the fan motor 121 is stopped. At T=280 sec, the state returns from the sleep state to the standby state, and the fourth job is started. In this case, the sleep time of the fan motor 121 (that is also the value of the temperature counter value N) is 60 sec (=280 sec−220 sec), and the temperature of the FET 220 is the initial temperature during standby (40° C.) (FIG. 9B). Therefore, the rotation speed (step V) of the fan motor 121 at the start of the fourth job after returning from the sleep state is step 1 because the temperature counter value N is 60. The variable Q of the holding time T_st for updating the step number of the fan motor 121 after the start of the fourth job is set to Q=10 because the value of the temperature counter N is 60.

As described, in the present embodiment, the FET 220 is cooled by changing the rotation speed (step number) of the fan motor 121 according to the temperature of the FET 220 of the power supply apparatus 120 when the state returns from the sleep state to the standby state. As a result, the wind noise in operating the fan motor 121 can be minimized in the present embodiment when the state returns from the sleep state.

As described, according to the present embodiment, the noise of the fan motor can be reduced by controlling the fan motor according to the temperature state of the power supply apparatus during standby.

[The Rotation Speed of Fan Motor and Temperature of FET]

Figure 10A:
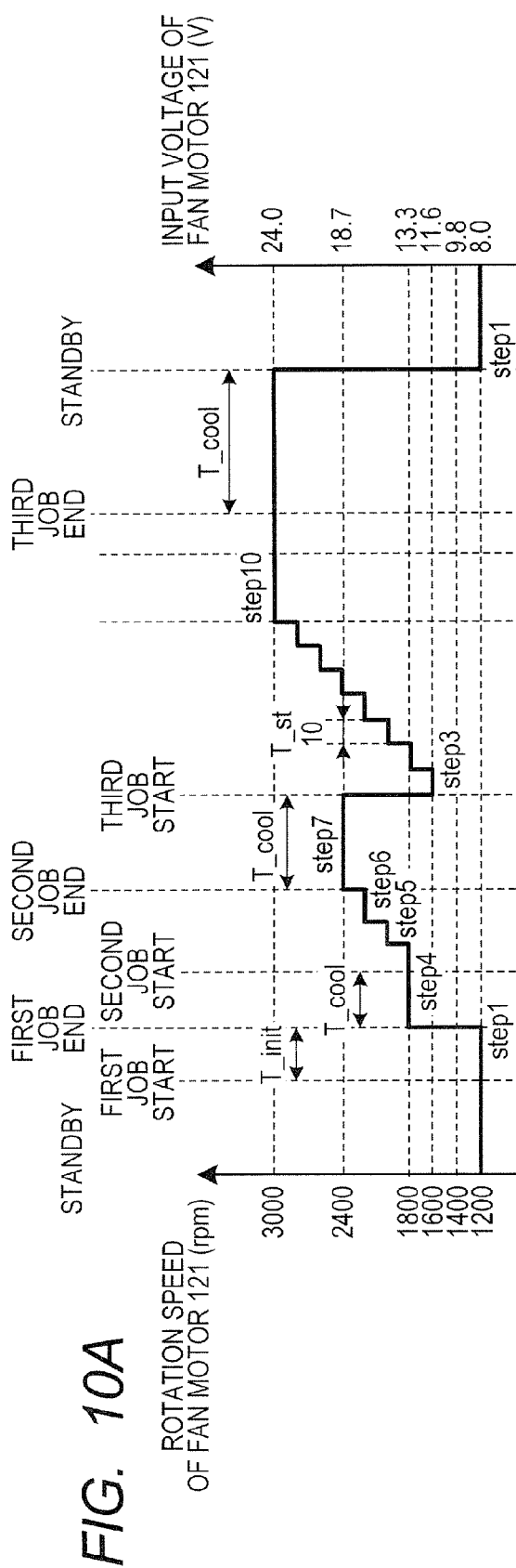
FIGS. 10A and 10B are a diagram illustrating a relationship between the time chart of the rotation speed of the fan motor and the temperature of the FET according to the fourth embodiment.
Figure 10B:
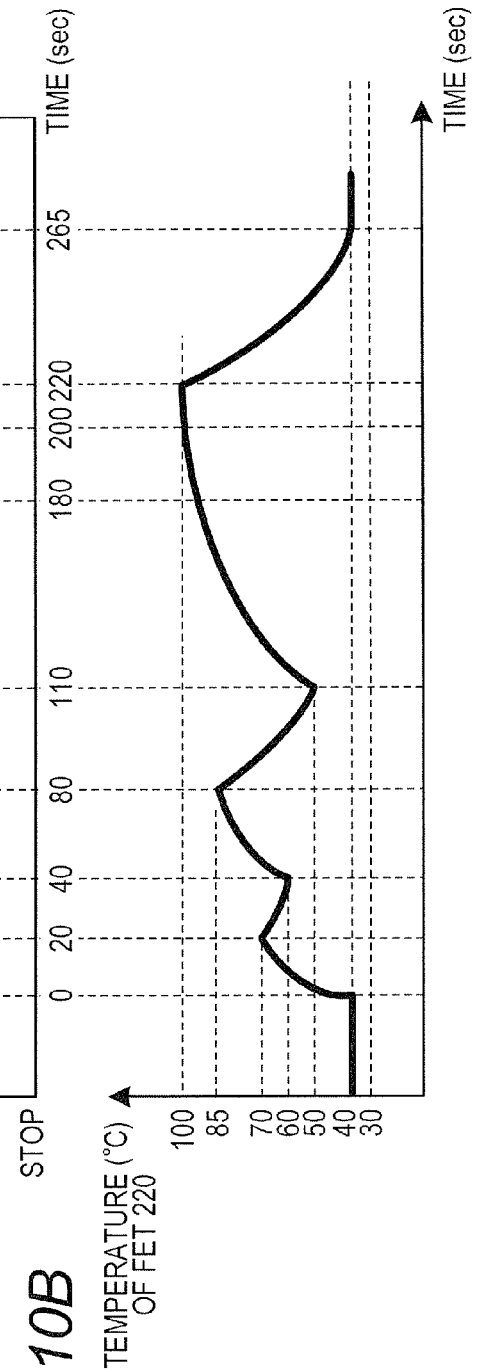

FIGS. 10A and 10B illustrate a relationship between the time chart of the rotation speed of the fan motor 121 and the temperature of the FET 220 according to the present embodiment. FIGS. 10A and 10B are one of the embodiments in the control process of the fan motor 121 according to the present embodiment based on Table 1 described later. The temperature of the FET 220 is an example in the time chart of the rotation speed of the fan motor 121. In FIG. 10A, the left vertical axis indicates the rotation speed (rpm) of the fan motor 121, and the right vertical axis indicates the input voltage (V) of the fan motor 121. In FIG. 10B, the vertical axis indicates the temperature (° C.) of the FET 220, and the horizontal axis indicates the time (sec (second)).

In the case described in the present embodiment, the controller 119 of the image forming apparatus 100 receives jobs for forming images on one or a plurality of recording sheets P. The jobs received by the controller 119 will be called a first job, a second job and a third job in the order of reception. The timing of the start of the first job is T=0 sec (second). At T=0 sec, the image forming apparatus 100 shifts from the standby state to the print state. The temperature of the FET 220 at T=0 sec is 40° C. as illustrated in FIG. 10B. Hereinafter, the temperature of 40° C. that is a second predetermined temperature of the FET 220 in the standby state after sufficient cooling of the FET 220 will be called an initial temperature during standby.

From T=0 sec to T_init=20 sec, the fan motor 121 is driven in step 1 (1200 rpm, 8 V) that is a second rotation speed indicating the lowest rotation speed. The first job ends at T_init=20 sec. In this case, the temperature of the FET 220 rises from 40° C., which is the initial temperature during standby, to 70° C. T=20 to 40 sec is a cooling period after the end of the first job, which will be called a cooling period T_cool. The temperature of the FET 220 has risen to 70° C., and cooling of the FET 220 is insufficient if the rotation speed of the fan motor 121 remains in step 1. Therefore, the fan motor 121 cools the FET 220 with the rotation speed of step 4 (1800 rpm, 13.3 V).

At T=40 sec, the second job is started. At this point, the temperature of the FET 220 is 60° C. The fan motor 121 increases the step number by one from step 4 (1800 rpm, 13.3 V) at each holding time of the rotation speed of the fan motor 121. Hereinafter, the holding time that is a time for holding the rotation speed, i.e. each step, of the fan motor 121 will be called T_st, and in the present embodiment, T_st is 10 sec, for example. The second job ends at T=80 sec. When the second job ends at T=80 sec, the fan motor 121 is driven in step 7 (2400 rpm, 18.7 V), and the temperature of the FET 220 reaches 85° C. After the end of the second job, the fan motor 121 is still driven in step 7 (2400 rpm, 18.7 V) in the cooling period T_cool, and the temperature of the FET 220 is cooled to 50° C. between the end of the second job and T=110 sec.

The third job is started at T=110 sec. At this point, the rotation speed of the fan motor 121 decreases from step 7 (2400 rpm, 18.7 V) to step 3 (1600 rpm, 11.6 V). When the third job is started, the rotation speed of the fan motor 121 increases from step 3 (1600 rpm, 11.6 V) at each holding time T_st=10 sec. At T=180 sec, the rotation speed of the fan motor 121 is step 10 (3000 rpm, 24 V). At T=200 sec, the temperature of the FET 220 reaches 100° C. that is the saturation temperature. The third job ends at T=220 sec. After the end of the third job at T=220 sec, the fan motor 121 is still driven in step 10 (3000 rpm, 24 V), which is a third rotation speed, in the cooling period T_cool. The FET 220 is cooled to 40° C. that is the initial temperature during standby, until the image forming apparatus 100 shifts from the print state to the standby state at T=265 sec. At T=265 sec, the rotation speed of the fan motor 121 is lowered from step 10 to step 1.

[Temperature Counter and Temperature of FET]

FIGS. 11A and 11B are diagrams illustrating a relationship between the time chart of the temperature counter of the FET 220 and the temperature of the FET 220 according to the present embodiment. The vertical axis of FIG. 11A indicates the temperature counter. The vertical axis of FIG. 11B indicates the temperature (° C.) of the FET 220. The horizontal axis indicates the time (sec). The CPU 201 includes the temperature counter of the FET 220 and includes a table for converting the temperature of the FET 220 measured in advance and the temperature counter value. The CPU 201 refers to the temperature counter value and the table described above to predict the temperature of the FET 220 and controls the rotation speed of the fan motor 121 based on the predicted temperature of the FET 220. The table with information associating the temperature of the FET 220 and the temperature counter value (in other words, passing of time) is stored in the ROM 201a. Here, the temperature counter value is N. When the print state is shifted to the standby state after the end of the previous job, the CPU 201 starts counting the temperature counter value N and raises N by one count every 1 sec. The CPU 201 determines the temperature of the FET 220 based on the temperature counter value N in the operating state of the image forming apparatus 100 at the determination of the temperature of the FET 220 and based on the step number that is the rotation speed of the fan motor 121. Since the temperature counter value N is counted every 1 sec, the temperature counter value N indicates an elapsed time from the shift from the print state to the standby state.

At time T=0 sec with the start of the first job, the CPU 201 determines whether the temperature counter value N is equal to or greater than 60. In the present embodiment illustrated in FIGS. 11A and 11B, the temperature counter value N is equal to or greater than 60 (N≥60) at T=0 sec. Therefore, the CPU 201 determines that the temperature of the FET 220 is cooled to the initial temperature during standby (40° C.) and starts counting after setting the temperature counter value N to 0. Here, it is measured and checked in advance that the temperature of the FET 220 is equal to or lower than the initial temperature during standby (40° C.) if the value of the temperature counter value N after the end of the previous job is equal to or greater than 60. Therefore, the CPU 201 can correctly determine the temperature of the FET 220 based on the temperature counter value N. The CPU 201 determines the temperature of the FET 220 based on the temperature counter value N to thereby control the rotation speed of the fan motor 121.

When the first job ends at T=20 sec, i.e. when the temperature counter value N is 20, the CPU 201 determines that the temperature of the FET 220 is 70° C. and starts counting after setting the temperature counter value to N=0. More specifically, the CPU 201 determines the temperature of the FET 220 based on the temperature counter value N and the information of the table stored in the ROM 201a. The same applies hereinafter, and the detailed description will not be repeated. Until T=40 sec, i.e. until the temperature counter value N is 20, the CPU 201 performs the cooling operation of the FET 220 by the fan motor 121 in the cooling period T_cool. The cooling operation performed in the cooling period T_cool after the end of the job will be simply called cooling operation. At time T=40 sec with the start of the second job, i.e. when the temperature counter value N is 20, the CPU 201 determines that the temperature of the FET 220 is 60° C. and starts counting after setting the temperature count value to N=0. At time T=80 sec with the end of the second job, i.e. when N=40, the CPU 201 determines that the temperature of the FET 220 is 85° C. and starts counting after setting N=0. Until T=110 sec, i.e. until the temperature counter value N is 30, the CPU 201 performs the cooling operation of the FET 220 by the fan motor 121 in the cooling period T_cool.

At time T=110 sec with the start of the third job, i.e. when the temperature counter value N is 30, the CPU 201 determines that the temperature of the FET 220 is 50° C. and starts counting after setting N=0. At T=200 sec, i.e. when the temperature counter value N is 90, the temperature of the FET 220 reaches the saturation temperature and is 100° C. At time T=220 sec with the end of the third job, i.e. when the temperature counter value N is 110, the CPU 201 determines that the temperature of the FET 220 is 100° C. and starts counting after setting N=0. Until T=265 sec, i.e. until the temperature counter value N is 45, the CPU 201 performs the cooling operation by the fan motor 121 in the cooling period T_cool. The fan motor 121 cools the FET 220 until the temperature counter value N is 45. As a result, the FET 220 is cooled to the initial temperature during standby (40° C.), and the rotation speed of the fan motor 121 shifts to step 1 at T=265 sec.

[The Rotation Speed of Fan Motor and Time of Rotation]

Table 1 illustrates a relationship between the rotation speed of the fan motor 121 during the cooling operation and the time of rotation. The first line of Table 1 illustrates the step number (step) indicating the rotation speed of the fan motor 121, and the second line indicates the cooling period T_cool (sec) of the fan motor 121. As described in FIG. 2B, the operation sound of the fan motor 121 increases with an increase in the rotation speed of the fan motor 121. Therefore, as illustrated in Table 1, a shorter cooling period T_cool is set for a larger rotation speed of the fan motor 121, i.e. a larger step number. The cooling period T_cool of step 10, which is the rotation speed with the maximum wind noise of the fan motor 121, is 45 sec. The cooling period T_cool of step 8 and step 9 with suppressed wind noise of the fan motor 121 is 50 sec. The cooling period T_cool of step 6 and step 7 is set to 55 sec, and the cooling period T_cool of step 5 or lower is set to 60 sec. The cooling period T_cool is set to the minimum time required for the temperature of the FET 220 to be equal to or lower than the initial temperature during standby (40° C.) as illustrated in FIGS. 11A and 11B.

TABLE 1

| step | T_cool (sec) |
|---|---|
| 1 | 60 |
| 2 | |
| 3 | |
| 4 | |
| 5 | |
| 6 | 55 |
| 7 | |
| 8 | 50 |
| 9 | |
| 10 | 45 |

[Control Process of the Rotation Speed of Fan Motor]

Figures 12, 12A, 12B:
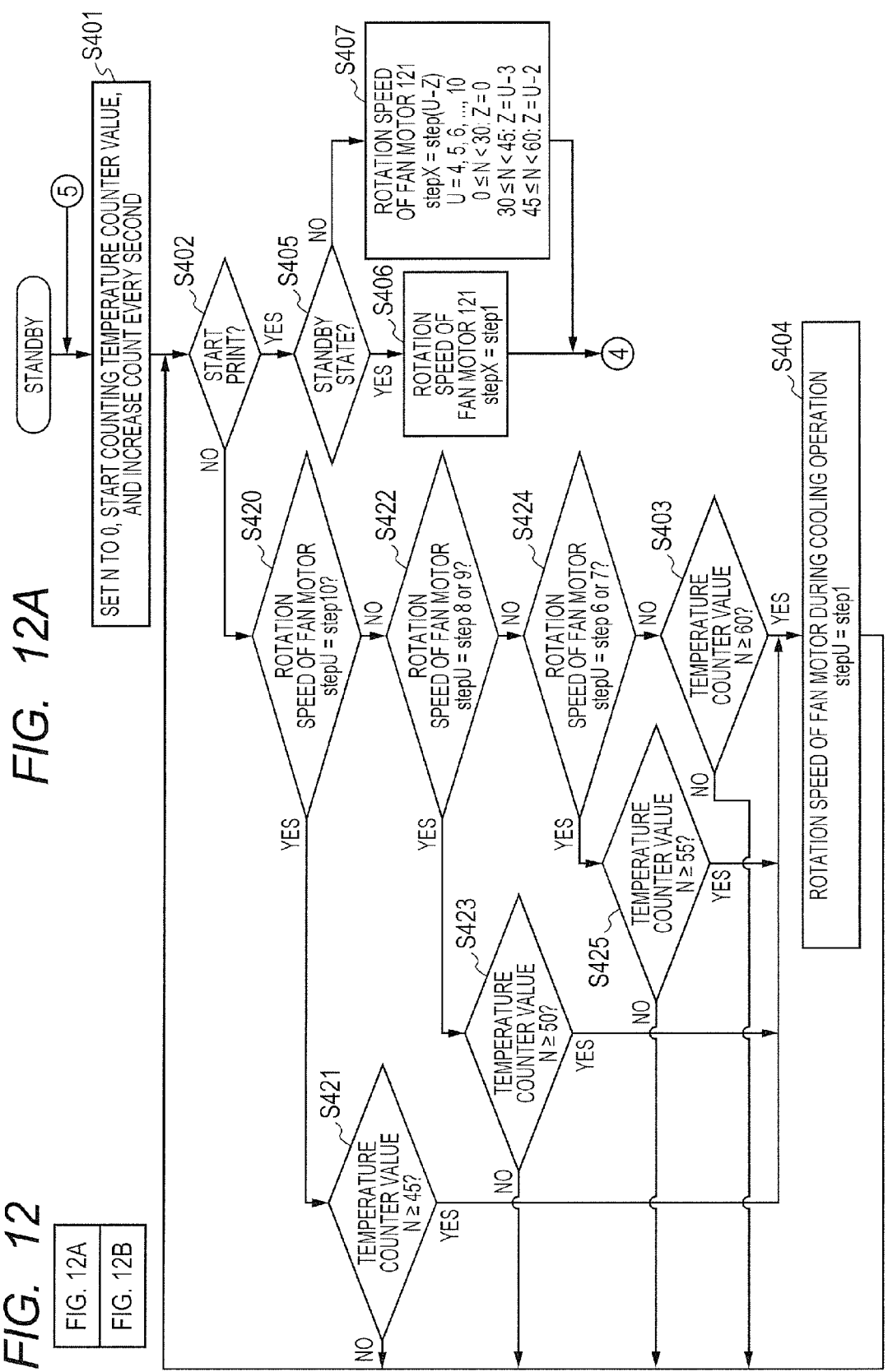
FIG. 12 composed of FIGS. 12A and 12B is a flow chart illustrating a control process of the rotation speed of the fan motor according to the fourth embodiment.
Figure 12B:
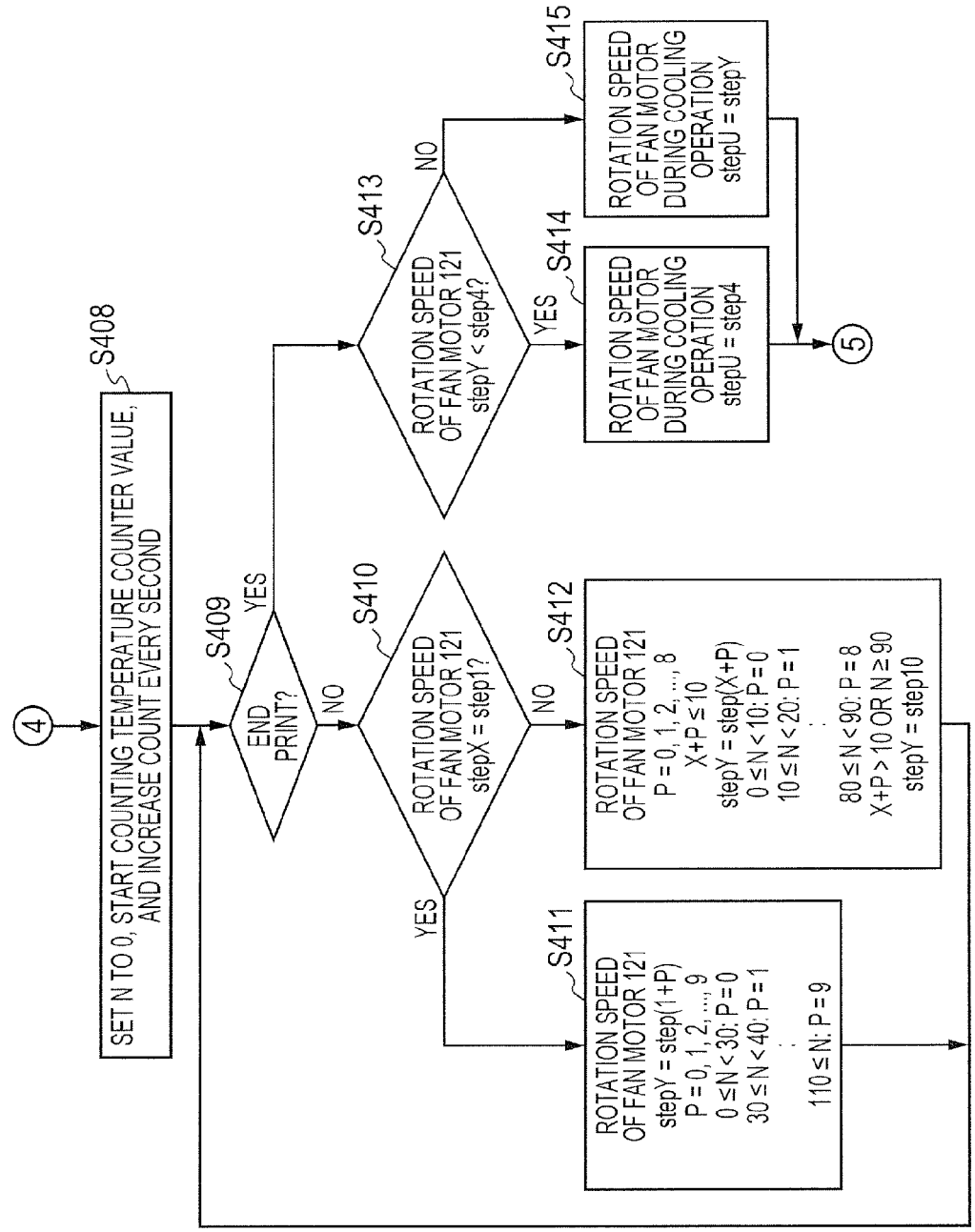

FIG. 12 is a flow chart illustrating a control process of the rotation speed of the fan motor 121 according to the present embodiment. Hereinafter, processes of FIGS. 12 and 14 are controlled and determined by the CPU 201. The rotation speed of the fan motor 121 is step X at the start of printing, is step Y in the print operation, and is step U during the cooling operation. In the control process of the rotation speed of the fan motor 121 according to the present embodiment, the rotation speed of the fan motor 121 is controlled as follows if the cooling operation after the end of the previous job is not sufficiently performed, and the temperature of the FET 220 does not return to the initial temperature during standby (40° C.). More specifically, the rotation speed of the fan motor 121 at the start of the next job is raised to step 2 or higher.

The process of FIG. 12 is started when the image forming apparatus 100 enters the standby state. In step (hereinafter, called "S") 401, the CPU 201 sets the temperature counter value N to 0 and starts counting the temperature counter value N. The CPU 201 raises the temperature counter value N by 1 every second. In S402, the CPU 201 monitors the presence or absence of a command for starting the print to determine whether to start the print operation. If the CPU 201 determines in S402 that there is an instruction for starting the print, i.e. if the CPU 201 determines to start the print operation, the CPU 201 determines in S405 whether the state is the standby state. As described, the CPU 201 refers to the temperature counter value N to determine that the state is the standby state if the temperature counter value N is equal to or greater than 60 and to determine that the state is not the standby state if the temperature counter value N is less than 60. If the CPU 201 determines in S405 that the state is the standby state, the CPU 201 determines that the temperature of the FET 220 is cooled to 40° C., which is the initial temperature during standby, or lower in the cooling operation after the end of the previous job. Therefore, in S406, the CPU 201 drives the fan motor 121 in step 1 (step X=step 1).

On the other hand, if the CPU 201 determines in S405 that the state is not the standby state, the CPU 201 determines that the temperature of the FET 220 is not cooled to 40° C., which is the initial temperature during standby, in the cooling operation after the end of the previous job. Therefore, in S407, the CPU 201 raises the rotation speed (step X) of the fan motor 121 at the start of printing to step 2 or higher according to step U that is the step number of the fan motor 121 during the cooling operation of the previous job and according to the current temperature counter value N. In the process of S407, the CPU 201 determines the rotation speed of the fan motor 121 at the start of the image forming operation based on the rotation speed of the fan motor 121 at the start of the period of the cooling operation before the start of the image forming operation. A specific example of the rotation speed (step X) of the fan motor 121 at the start of printing that is set by the CPU 201 in S407 is illustrated below.

step $X$=step$(U-Z)$

U=4, 5, 6, . . . , 10
0≤N<30: Z=0
30≤N<45: Z=U−3
45≤N<60: Z=U−2 In this way, the CPU 201 sets the rotation speed (step X) of the fan motor 121 at the start of printing to a greater value when the temperature counter value N is smaller, i.e. when the elapsed time from the end of the previous job is shorter, to increase the effect of cooling by the fan motor 121.

For example, at the start of the third job of FIGS. 10A and 10B, the step number (step U) during the cooling operation of the second job that is the previous job is step 7, and U is 7. Since the temperature counter value N is 30, Z=U−3=7−3=4. Therefore, the step number (step X) at the start of printing is step (U−Z)=step (7−4)=step 3.

In this way, one of Z=0, Z=U−3 and Z=U−2 is selected according to the value of the temperature counter value N, and as a result, the value of the step number (step X) of the fan motor 121 at the start of printing is determined. Here, the rotation speed of the fan motor 121 at the start of printing is changed according to the value of the temperature counter value N (0 to 60) after the end of the previous job. The larger the value of the temperature counter value N, the lower the temperature of the FET 220 determined by the CPU 201. Therefore, a small value is set for the step number at the start of the next job. Here, step U during the cooling operation is a step number during the cooling operation after the end of the previous job. When the rotation speed (step U) of the fan motor 121 is a rotation speed lower than step 4 during the cooling operation, the air flow is small, and the temperature of the FET 220 cannot return to the initial temperature during standby (40° C.) even when the value of the temperature counter value N is equal to or greater than (N≥60). Therefore, the rotation speed (step U) of the fan motor 121 during the cooling operation is set to step 4 or higher (4≤U≤10). The determination process of step U will be described later in S413 to S415.

In S408, the CPU 201 starts counting after setting the temperature counter value N to 0 and raises the count every 1 sec. In S409, the CPU 201 determines whether the print operation is finished by monitoring whether there is a command for the print operation. If the CPU 201 determines in S409 that the print operation is not finished, i.e. if the CPU 201 determines to continue the print operation, the CPU 201 proceeds to the process of S410. In S410, the CPU 201 determines whether the rotation speed (step X) of the fan motor 121 at the start of printing is step 1. If the CPU 201 determines in S410 that the rotation speed (step X) of the fan motor 121 at the start of printing is step X=step 1, the CPU 201 determines that the temperature of the FET 220 is the initial temperature during standby (40° C.) and proceeds to the process of S411. In S411, the CPU 201 refers to the temperature counter value N to determine the rotation speed (step Y) of the fan motor 121 in the print operation as follows.

step Y=step(1+P)

P=0, 1, 2, . . . , 9
0≤N<30: P=0
30≤N<40: P=1
40≤N<50: P=2
50≤N<60: P=3
60≤N<70: P=4
70≤N<80: P=5
80≤N<90: P=6
90≤N<100: P=7
100≤N<110: P=8
110≤N: P=9

As a result, if the step number (step X) at the start of the print operation is step 1, step 1 is maintained while the temperature counter value N is N<30, and T_init described above is secured. In this case, one of P=0 to 9 is selected according to the value of the temperature counter value N described above, and as a result, the value of the step number (step Y) of the fan motor 121 in the print operation is determined. If the temperature counter value N is equal to or greater than 120, step Y is set to step 10. Here, the temperature of the FET 220 increases with an increase in the temperature counter value N. Therefore, the step number is changed in stages to prevent a rapid temperature change of the FET 220 while suppressing the operation sound caused by the wind noise of the fan motor 121. Here, if the temperature counter value is equal to or greater than 30, the rotation speed of the fan motor 121 rises, up to step 10, every time the temperature counter value N increases by 10 (T_st=10), unless the print is finished.

On the other hand, if the CPU 201 determines in S410 that the rotation speed (step X) of the fan motor 121 at the start of printing is not step X=step 1, the CPU 201 proceeds to the process of S412. In S412, the CPU 201 determines that the temperature of the FET 220 is higher than 40° C. that is the initial temperature during standby. In S412, the CPU 201 sets the rotation speed (step Y) of the fan motor 121 in the print operation as follows.

step Y=step(X+P)

P=0, 1, 2, . . . , 9
If X+P≤10,
0≤N<10: P=0
10≤N<20: P=1
20≤N<30: P=2
30≤N<40: P=3
40≤N<50: P=4
50≤N<60: P=5
60≤N<70: P=6
70≤N<80: P=7
80≤N<90: P=8
If X+P>10 or if N≥90
step Y=step 10

For example, in the third job of FIGS. 10A and 10B, the step number (step X) at the start of printing is step 3, and X is 3. If the temperature counter value N is 10, P is 1. Therefore, the step number (step Y) in the print operation is step (X+P)=step (3+1)=step 4. Subsequently, the rotation speed of the fan motor 121 increases to step 5, step 6 and so forth, every time the temperature counter value N rises by 10. When the temperature counter value N is 70, P is 7, and X+P=3+7=10. The step number (step Y) in the print operation reaches step 10. Subsequently, the step number (step Y) in the print operation is maintained in step 10 until the end of the third job.

In this way, when X+P is equal to or smaller than 10, one of P=0 to 8 is selected according to the value of the temperature counter value N, and as a result, the value of the rotation speed (step Y) of the fan motor 121 in the print operation is determined. In the process of S412, it is determined that the temperature of the FET 220 at the start of printing is higher (50° C. in the third job of FIGS. 10A and 10B) than in the process of S411, and the step number is changed in stages, from a large step number, in a shorter time than in S411.

If the CPU 201 determines in S409 that the print operation is finished, the CPU 201 proceeds to the process of S413. In S413, the CPU 201 determines whether the rotation speed of the fan motor 121 at the start of printing is step Y<step 4. The determination of S413 is a process for determining the rotation speed of the fan motor 121 at the start of the cooling operation based on the rotation speed of the fan motor 121 at the end of the image forming operation. If the CPU 201 determines in S413 that step Y<step 4, the CPU 201 proceeds to the process of S414. In S414, the CPU 201 sets the rotation speed of the fan motor 121 during the cooling operation to step U=step 4 and returns to the process of S401. For example, in the first job of FIGS. 10A and 10B, the step number (step Y) at the end of printing is step 1. Therefore, the step number (step U) during the cooling operation after the end of the first job is step 4.

On the other hand, if the CPU 201 determines in S413 that step Y is not smaller than step 4, i.e. if the CPU 201 determines that step Y≥step 4, the CPU 201 proceeds to the process of S415. In S415, the CPU 201 sets the rotation speed of the fan motor during the cooling operation to step U=step Y and returns to the process of S401. For example, in the second job of FIGS. 10A and 10B, the step number (step Y) in the print operation at the end of the second job is step 7. Therefore, the step number (step U) during the cooling operation after the end of the second job is step 7. The determination of S413 is for executing the cooling operation with a large rotation speed of the fan motor 121 when the print operation is executed while the FET 220 is not sufficiently cooled at the start of the job. The determination of S413 is a process for preventing the rotation speed (step U) of the fan motor 121 at the start of the cooling operation from becoming lower than the rotation speed of step 4. This prevents a situation in which the temperature of the FET 220 cannot return to the initial temperature of 40° C. due to a small air flow of the fan motor 121, even when the temperature counter value N is equal to or greater than 60.

If the CPU 201 determines in S402 that there is no instruction for starting the print, the CPU 201 proceeds to the process of S420. In S420, the CPU 201 determines whether the rotation speed (step U) of the fan motor 121 during the cooling operation is step 10. If the CPU 201 determines in S420 that the step number (step U) during the cooling operation is step 10, the CPU 201 proceeds to the process of S421. In S421, the CPU 201 determines whether the temperature counter value N is N≥45. If the CPU 201 determines in S421 that the temperature counter value N is not N≥45, i.e. N<45, the CPU 201 returns to S402. On the other hand, if the CPU 201 determines in S421 that the temperature counter value N is N≥4, the CPU 201 determines that the temperature of the FET 220 is equal to or lower than 40° C. that is the initial temperature during standby, and the CPU 201 proceeds to the process of S404. In S404, the CPU 201 sets the rotation speed of the fan motor 121 during the cooling operation to step 1 and returns to the process of S402. For example, in the third job of FIGS. 10A and 10B, the step number (step U) during the cooling operation is step 10 at the end of the third job. Therefore, as described in Table 1, the cooling period T_cool is 45 sec when the step number of the fan motor 121 during the cooling operation is step 10. In the third job, it is determined that the FET 220 is cooled to 40° C. when the temperature counter value N is 45, and the step number (step U) during the cooling operation is set to step 1.

If the CPU 201 determines in S420 that the rotation speed (step U) of the fan motor 121 during the cooling operation is not step 10, the CPU 201 determines whether the rotation speed (step U) of the fan motor 121 during the cooling operation is one of step 8 and step 9 in S422. In S422, if the CPU 201 determines that the step number (step U) during the cooling operation is one of step 8 and step 9, the CPU 201 proceeds to the process of S423. In S423, the CPU 201 determines whether the temperature counter value N is N≥50. If the CPU 201 determines that the temperature counter value N is not N≥50, i.e. N<50, the CPU 201 returns to the process of S402. On the other hand, if the CPU 201 determines in S423 that the temperature counter value N is N≥50, the CPU 201 determines that the temperature of the FET 200 is 40° C., which is the initial temperature during standby, or lower and proceeds to the process of S404. As described in Table 1, the cooling period T_cool is 50 sec when the step number (step U) of the fan motor 121 during the cooling operation is one of step 8 and step 9.

If the CPU 201 determines in S422 that the rotation speed (step U) of the fan motor 121 during cooling operation is not one of step 8 and step 9, the CPU 201 determines in S424 whether the rotation speed (step U) of the fan motor 121 during the cooling operation is one of step 6 and step 7. If the CPU 201 determines in S424 that the step number (step U) during the cooling operation is one of step 6 and step 7, the CPU 201 proceeds to the process of S425. In S425, the CPU 201 determines whether the temperature counter value N is N≥55. If the CPU 201 determines in S425 that the temperature counter value N is not N≥55, i.e. N<55, the CPU 201 returns to the process of S402. On the other hand, if the CPU 201 determines in S425 that the temperature counter value N is N≥55, the CPU 201 determines that the temperature of the FET 220 is equal to or lower than 40°, which is the initial temperature during standby, and proceeds to the process of S404. For example, in the second job of FIGS. 10A and 10B, the step number (step U) during the cooling operation is step 7 at the end of the second job. Therefore, as described in Table 1, the cooling period T_cool is 55 sec when the step number U of the fan motor 121 during the cooling operation is step 7. However, the third job is started before a lapse of the cooling period T_cool after the end of the second job, specifically, when the temperature counter value N is 30. Therefore, the process of S404 is not executed in the second job of FIGS. 10A and 10B.

If the CPU 201 determines in S424 that the rotation speed (step U) of the fan motor 121 during the cooling operation is not one of step 6 and step 7, the CPU 201 proceeds to the process of S403. In S403, the CPU 201 determines whether the temperature counter value N is N≥60. If the CPU 201 determines in S403 that the temperature counter value N is not N≥60, i.e. N<60, the CPU 201 returns to the process of S402. On the other hand, if the CPU 201 determines in S403 that the temperature counter value N is N≥60, the CPU 201 determines that the temperature of the FET 220 is equal to or lower than 40° C., which is the initial temperature during standby, and proceeds to the process of S404. As described in Table 1, the cooling period T_cool is 60 sec when the step number (step U) of the fan motor 121 during the cooling operation is step 1 to step 5.

As described, in the present embodiment, the cooling period T_cool of the fan motor 121 is changed and set in stages according to the rotation speed (step number) of the fan motor 121 in the cooling operation. The cooling period T_cool is the minimum time required to lower the temperature of the FET 220 to equal to or lower than 40° C. that is the initial temperature during standby, and in this time, the rotation speed of the fan motor 121 can be set to the rotation speed during standby state. Therefore, in the present embodiment, the wind noise caused by the fan motor 121 is not rapidly changed during the cooling operation, and the time of the generation of the operation sound can be reduced when the operation sound caused by the wind noise of the fan motor 121 is large.

According to the present embodiment, the operation sound of the fan motor can be reduced.

Fifth Embodiment

A control process of the rotation speed of the fan motor 121 according to a fifth embodiment has the following configuration. In the present embodiment, when the rotation speed of the fan motor 121 is in step 8 to step 10 in the cooling operation after the end of the job, the rotation speed is lowered to a quieter rotation speed, although not the standby state, at the point that the temperature of the FET 220 drops to a first predetermined temperature. The first predetermined temperature here is a temperature higher than 40° C., before the temperature of the FET 220 drops to the initial temperature during standby (40° C.). In the present embodiment, the first predetermined temperature before the temperature drops to the initial temperature during standby (40° C.) is 50° C. When the rotation speed of the fan motor 121 is step 8, step 9 or step 10, the rotation speed of the fan motor 121 is high, and the operation sound caused by the wind noise is particularly large. As shown in FIG. 2B, the operation sound when the rotation speed of the fan motor 121 is step 7 is quieter than the operation sound in step 8 to step 10.

In this way, according to the present embodiment, the rotation speed of the fan motor 121 can be lower in stages in the cooling operation after the end of the job, and particularly, the time with large operation sound can be reduced. Subsequently, the control during standby, in the print operation, and at the end of printing is the same as in the fourth embodiment, and the description will not be repeated. Only different control during cooling after the end of the job will be described.

[The Rotation Speed of Fan Motor and Temperature of FET]

FIGS. 13A and 13B illustrate a relationship between the time chart of the rotation speed of the fan motor 121 and the temperature of the FET 220 according to the present embodiment. FIGS. 13A and 3B show one of the embodiments in a control process of the fan motor 121 according to the present embodiment in FIG. 14 described later. In FIG. 13A, the left vertical axis indicates the rotation speed (rpm) of the fan motor 121, and the right vertical axis indicates the input voltage (V) of the fan motor 121. In FIG. 13B, the vertical axis indicates the temperature (° C.) of the FET 220, and the horizontal axis indicates the time (sec (second)). The operation until the end of the third job of FIGS. 13A and 3B (T=220 sec) is the same as in FIGS. 10A and 10B of the fourth embodiment, and the description will not be repeated. After the end of the third job at T=220 sec, the CPU 201 drives the step number (step U) during the cooling operation of the fan motor 121 in step 10. Subsequently, the FET 220 is cooled to 50° C. at T=245 sec. In the present embodiment, the rotation speed (step U) of the fan motor 121 is changed to step 7 that is a first rotation speed, at T=245 sec in which the FET 220 is cooled to 50° C. Subsequently, step 7 is maintained until T=275 sec, and the FET 220 is cooled to 40° C. that is the initial temperature during standby. The FET 220 reaches 40° C. that is the initial temperature during standby, and at T=275 sec, the rotation speed (step U) of the fan motor 121 is changed from step 7 to step 1 that is the standby state. As a result of the control, the time of rotation in step 10 with the largest operation sound can be reduced from 45 sec illustrated in FIG. 10A to 25 sec.

[Control Process of the Rotation Speed of Fan Motor]

FIG. 14 is a flow chart illustrating the control process of the rotation speed of the fan motor 121 according to the present embodiment. In the present embodiment, the processes of S501 to S503 are different from the control process of the rotation speed of the fan motor 121 described in FIG. 12. Therefore, the same processes as in FIG. 12 are designated with the same step numbers, and the description will not be repeated.

If the CPU 201 determines in S420 that the rotation speed (step U) of the fan motor 121 during the cooling operation is step 10, the CPU 201 determines in S501 whether the temperature counter value N is N≥25. If the CPU 201 determines in S501 that the temperature counter value N is not N≥25, i.e. N<25, the CPU 201 returns to the process of S402. If the CPU 201 determines in S501 that the temperature counter value N is N≥25, the CPU 201 determines that the temperature of the FET 220 is equal to or lower than 50° C. In S503, the CPU 201 sets the rotation speed (step U) of the fan motor 121 during the cooling operation to step 7 and returns to the process of S402.

If the CPU 201 determines in S420 that the step number (step U) of the fan motor 121 during the cooling operation is not step 10, the CPU 201 proceeds to the process of S422. If the CPU 201 determines in S422 that the rotation speed of the fan motor 121 during the cooling operation is one of step 8 and step 9, the CPU 201 determines whether the temperature counter N is N≥30 in S502. If the CPU 201 determines in S502 that the temperature counter value N is not N≥30, i.e. N<30, the CPU 201 returns to the process of S402. If the CPU 201 determines in S502 that the temperature counter value N is N≥30, the CPU 201 determines that the temperature of the FET 220 is equal to or lower than 50° C. and proceeds to the process of S503.

If the CPU 201 determines in S422 that the step number (step U) of the fan motor 121 during post-processing operation is not one of step 8 and step 9, the CPU 201 proceeds to the process of S424. The process when the step number (step U) of the fan motor 121 during the cooling operation is equal to or lower than step 7 is the same as the process described in FIG. 12 of the fourth embodiment, and the description will not be repeated. The values 25 and 30 of the temperature counter value N used in the determinations of S501 and S502 are determined according to the characteristics of the image forming apparatus.

In the present embodiment, step U for which the rotation speed of the fan motor 121 during the cooling operation after the end of the job is switched in stages is from step 8 to step 10. The rotation speed of the fan motor 121 after the change is set to step 7, and the threshold of the temperature of the cooling target unit in changing the step number is set to 50° C. However, these settings are not limited, and the settings can be arbitrarily set according to the cooling target.

As described, according to the present embodiment, the operation sound caused by the wind noise of the fan motor 121 can be reduced while maintaining the performance of cooling the FET 220. According to the present embodiment, the operation sound of the fan motor can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-241977, filed Nov. 28, 2014, Japanese Patent Application No. 2014-241978, filed Nov. 28, 2014, and Japanese Patent Application No. 2015-104703, filed May 22, 2015, which are hereby incorporated by reference herein in their entirety.

What is claimed is:

1. An image forming apparatus for forming an image on a recording material, wherein the image forming apparatus comprises:
a cooling unit configured to cool a portion to be cooled; and
a control unit configured to control a rotation speed of the cooling unit,
wherein in a case where a first image forming operation is finished, after the control unit controls the cooling unit to rotate at a first speed, the control unit controls the cooling unit to rotate at a second speed slower than the first speed,
wherein in a case where a second image forming operation starts during a period in which the cooling unit rotates at the first speed, the control unit sets the rotation speed of the cooling unit at a time when the second image forming operation starts to be a third speed, and
wherein in a case where the second image forming operation starts during a period in which the cooling unit rotates at the second speed, the control unit sets the rotation speed of the cooling unit at the time when the second image forming operation starts to be a fourth speed slower than the third speed.

2. The image forming apparatus according to claim 1, wherein the control unit sets the third speed based on a length of a period from a time when the cooling unit starts to rotate at the first speed to a time when the second image forming operation starts.

3. The image forming apparatus according to claim 2, wherein the shorter the period is, the faster the control unit sets the third speed.

4. The image forming apparatus according to claim 1, wherein the control unit sets the third speed at a speed faster than the second speed and slower than or equal to the first speed.

5. The image forming apparatus according to claim 4, wherein the control unit sets the fourth speed to be equal to the second speed.

6. The image forming apparatus according to claim 5, wherein the second speed is the slowest speed among rotation speeds of the cooling unit.

7. The image forming apparatus according to claim 1, wherein the control unit sets the first speed based on the rotation speed of the cooling unit at a time when the first image forming operation finishes.

8. The image forming apparatus according to claim 7, wherein in a case where the rotation speed of the cooling unit at the time when the first image forming operation finishes is slower than a predetermined rotation speed, the control unit sets the first rotation speed at the predetermined rotation speed, and in a case where the rotation speed of the cooling unit at the time when the first image forming operation finishes is faster than or equal to the predetermined rotation speed, the control unit sets the first speed at a speed equal to the rotation speed of the cooling unit at the time when the first image forming operation finishes.

9. The image forming apparatus according to claim 1, wherein the control unit sets a length of a period during which the cooling unit rotates at the first speed based on the first speed.

10. The image forming apparatus according to claim 9, wherein the faster the first speed is, the shorter the control unit sets the length of the time period during which the cooling unit rotates at the first speed.

11. The image forming apparatus according to claim 1, wherein the control unit gradually increases the rotation speed of the cooling unit while the second image forming operation is performed.

12. The image forming apparatus according to claim 11, wherein in a case where the rotation speed of the cooling unit reaches the fastest speed among rotation speeds of the cooling unit while the second image forming operation is performed, the control unit maintains the rotation speed of the cooling unit at the fastest speed.

13. The image forming apparatus according to claim 1, wherein the control unit controls the cooling unit to stop after the cooling unit rotates at the second speed during a predetermined time period.

14. The image forming apparatus according to claim 13, wherein in a case where the second image forming operation starts during a period in which the cooling unit stops, the control unit sets the rotation speed of the cooling unit at the time when the second image forming operation starts at the second speed.

15. The image forming apparatus according to claim 14, wherein the second speed is the slowest speed among rotation speeds of the cooling unit.

16. The image forming apparatus according to claim 1, further comprising:

a power supply configured to generate a DC voltage by performing a switching operation by an FET, wherein the portion to be cooled is the FET.

* * * * *